(12) United States Patent
Choi et al.

(10) Patent No.: US 11,583,134 B2
(45) Date of Patent: Feb. 21, 2023

(54) ARTIFICIAL INTELLIGENCE COOKING DEVICE

(71) Applicant: LG ELECTRONICS INC., Seoul (KR)

(72) Inventors: Heungsik Choi, Seoul (KR); Hyojin An, Seoul (KR); Sangoh Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 606 days.

(21) Appl. No.: 16/617,434

(22) PCT Filed: Jul. 15, 2019

(86) PCT No.: PCT/KR2019/008726
§ 371 (c)(1),
(2) Date: Nov. 26, 2019

(87) PCT Pub. No.: WO2021/010509
PCT Pub. Date: Jan. 21, 2021

(65) Prior Publication Data
US 2021/0338007 A1    Nov. 4, 2021

(51) Int. Cl.
*A47J 36/32* (2006.01)
*G05B 19/042* (2006.01)
(Continued)

(52) U.S. Cl.
CPC .......... *A47J 36/321* (2018.08); *G05B 19/042* (2013.01); *G06N 3/08* (2013.01); *H05B 6/1209* (2013.01);
(Continued)

(58) Field of Classification Search
None
See application file for complete search history.

(56) References Cited

U.S. PATENT DOCUMENTS 6,301,521 B1    10/2001    Chen et al.
9,395,078 B2    7/2016    Buendia Garcia et al.
(Continued)

FOREIGN PATENT DOCUMENTS

EP    2 999 301 A1    3/2016
KR    10-1390397 B1    4/2014
(Continued)

*Primary Examiner* — Mohammad Ali
*Assistant Examiner* — Saad M Kabir
(74) *Attorney, Agent, or Firm* — Birch, Stewart, Kolasch & Birch, LLP

(57) ABSTRACT

An artificial intelligence cooking device includes a plate including a heater configured to heat ingredients in a cooking vessel placed on the plate; a vibration sensor disposed below the plate configured to detect a vibration signal of the ingredients in the cooking vessel transmitted through the plate; and a processor configured to determine, via an artificial intelligence model having learned properties of the vibration signal, whether or not the ingredients in the cooking vessel are boiling based on the detected vibration signal provided to the artificial intelligence model and the learned properties of the vibration signal; and output information indicating whether or not the ingredients are boiling based on the determination.

19 Claims, 12 Drawing Sheets

(51) Int. Cl.
  *G06N 3/08* (2023.01)
  *H05B 6/12* (2006.01)
(52) U.S. Cl.
  CPC .. *G05B 2219/2643* (2013.01); *H05B 2213/05* (2013.01)

(56) References Cited

U.S. PATENT DOCUMENTS

| | | |
|---|---|---|
| 2009/0173731 A1 | 7/2009 | Nagamitsu et al. |
| 2010/0182136 A1 | 7/2010 | Pryor |
| 2013/0149679 A1 | 6/2013 | Tokuda et al. |
| 2016/0235239 A1 | 8/2016 | Patadia |
| 2017/0245327 A1 | 8/2017 | Viroli et al. |
| 2018/0271322 A1 | 9/2018 | Thai et al. |
| 2019/0041842 A1* | 2/2019 | Cella .................. G05B 23/0289 |
| 2019/0349213 A1* | 11/2019 | Shive ..................... G05B 15/02 |
| 2020/0253415 A1 | 8/2020 | Stork genannt Wersborg |

FOREIGN PATENT DOCUMENTS

| | | | |
|---|---|---|---|
| KR | 10-2017-0070535 A | 6/2017 |
| WO | WO 2006/070334 A1 | 7/2006 |
| WO | WO 2016/070232 A1 | 5/2016 |
| WO | WO 2019/052929 A1 | 3/2019 |

\* cited by examiner (a)

(b)

(c)

(d)

(e)

(a)

(b)

ARTIFICIAL INTELLIGENCE COOKING DEVICE

CROSS-REFERENCE TO RELATED APPLICATIONS

This application is a National Phase of PCT International Application No. PCT/KR2019/008726 filed on Jul. 15, 2019, all of which is hereby expressly incorporated by reference into the present application.

BACKGROUND OF THE INVENTION

Field of the Invention

The present invention relates to an artificial intelligence cooking device that can determine whether ingredients in a cooking vessel are boiling by inputting a vibration signal of the cooking vessel into an artificial intelligence model.

Discussion of the Related Art

Artificial intelligence, which means that computers can imitate a human intelligence, is a field of computer engineering and information technology that studies a method for allowing the computers to think, learn, self-develop, and the like that can be performed by the human intelligence. Further, the artificial intelligence does not exist by itself, but is directly or indirectly related to other fields of computer science. Particularly in the modern age, attempts to introduce artificial intelligence elements in various fields of information technology and to utilize the artificial intelligence elements in solving problems in the field are being actively carried out.

In an example, a technology that uses the artificial intelligence to recognize and learn an ambient situation, provides information desired by a user in a desired form, or performs an operation or a function desired by the user is being actively researched. Further, an electronic device providing such various operations and functions may be referred to as an artificial intelligence device.

In another example, when ingredients in a cooking vessel are constantly boiling by an operation of a cooking device, problems such as overflow of the ingredients, fire, or the like may occur. Further, in order to prevent the above-mentioned problems, the user must constantly check whether the ingredients are boiling. In order to prevent such inconvenience, technologies for determining, by the cooking device, whether the ingredients are boiling are disclosed in Korean Patent KR1390397B1, U.S. Pat. Nos. 6,301,521, 9,395,078, and the like.

Korea Patent KR1390397B1 and U.S. Pat. No. 6,301,521 propose technologies that combine many sensors such as a vibration sensor, an infrared sensor, a weight sensor, a sound wave sensor, a photo sensor, a timer, an acoustic sensor, an optical sensor, a temperature sensor, and the like. However, these technologies require many sensors and complex logic for processing and combining data collected from the many sensors.

Further, U.S. Pat. No. 9,395,078 proposes a technology for extracting changes in a vibration signal based on heating of the ingredients in chronological order and analyzing the signal at each step to determine whether the ingredients are boiling. However, this technology may be likely to misjudge when the standardized chronological-order logic is broken and may only be used in limited conditions (chronological flow, absence of external noise).

SUMMARY OF THE INVENTION

The present invention is to solve the above-mentioned problems, and the purpose of the present invention is to provide an artificial intelligence cooking device that can determine whether ingredients in a cooking vessel are boiling by inputting a vibration signal of the cooking vessel into an artificial intelligence model.

An aspect of the present invention provides an artificial intelligence cooking device including a heating portion for heating ingredients in a cooking vessel, a vibration sensor for detecting a vibration signal of the ingredients in the cooking vessel, and a processor configured to provide data corresponding to the vibration signal to an artificial intelligence model to obtain information about whether the ingredients in the cooking vessel are boiling, and perform control based on the obtained information.

According to the present invention, since whether the ingredients are boiling is determined using the artificial intelligence model, which learned properties of vibration (intensity, frequency, and pattern) generated by boiling of the ingredients, an accuracy of the determination on whether the ingredients are boiling can be improved.

Further, according to the present invention, data of a predetermined time period (e.g., 1 second) is input to the artificial intelligence model. Then, the artificial intelligence model can determine whether the ingredients are boiling by considering only data of a current time period (that is, without considering data of a previous time period together). That is, the present invention can be much less likely to misjudge and show a higher accuracy in the determination on whether the ingredients are boiling, compared to U.S. Pat. No. 9,395,078, which detects boiling by extracting a property based on a change in vibration signals in a chronological order.

Further, according to the present invention, despite a change in a type of the ingredients, a type of the cooking vessel, an amount of the ingredients, or the like, the accurate prediction on whether the ingredients are boiling may be achieved. Further, according to the present invention, since the vibration signal only needs to be processed in a usual signal processing scheme and then input into the artificial intelligence model, a processing algorithm may be simplified.

According to the present invention, when all of a plurality of information obtained corresponding to data of a plurality of consecutive time periods indicate that the ingredients in the cooking vessel are boiling, it is determined that the ingredients in the cooking vessel are boiling. Therefore, the accuracy of the prediction may be further improved.

According to the present invention, since whether the ingredients are boiling is detected and control is performed accordingly, overflow of the ingredients, fire, or the like can be prevented and inconvenience of the user of constantly checking whether the ingredients are boiling can be prevented. According to the present invention, cooking in accordance with various cooking schemes may be performed by only setting a temperature by the user.

According to the present invention, a vibration sensor module 106 is accommodated in an internal space of a main body 11. Accordingly, sensing, by the vibration sensor 610, of a vibration signal (e.g., ambient noise due to use of a cutting board, a mixer, or the like) generated from outside of an induction heating cooking device 1000 may be minimized. Further, according to the present invention, an outer holder 630 for receiving the vibration sensor module 106 therein is connected to and fixed to a plate 12. Accordingly, sensing, by the vibration sensor 610, of a vibration signal (e.g., vibration transmitted by the main body 11) transmitted through a structure other than the plate 12 may be minimized.

In an example, according to the present invention, the outer holder 630 is disposed in close contact with a lower face 15 of the plate 12 and surrounds side and the lower portions of the vibration sensor 610. Accordingly, the sensing, by the vibration sensor 610, of the vibration signal (e.g., ambient noise or the like due to use of a cutting board, a mixer, or the like) generated from the outside may be minimized.

According to the present invention, transmission of the vibration signal to a vibration sensor 710 through routes other than the plate 12 may be minimized by contacting a housing with the plate 12 by pressing of a pressing mechanism.

DETAILED DESCRIPTION OF THE EMBODIMENTS

Figure 1:
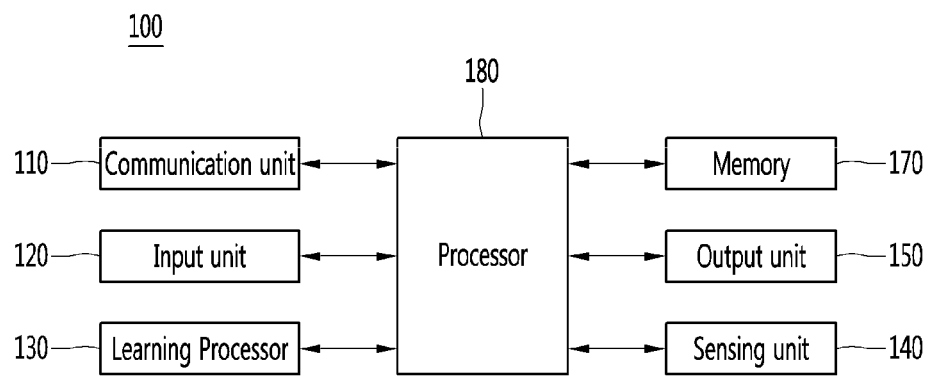
FIG. 1 illustrates an AI device 100 according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components. In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network. Machine learning may be classified into supervised learning, unsupervised learning, and reinforcement learning according to a learning method.

The supervised learning refers to a method of learning an artificial neural network when a label for learning data is given, and the label may mean the correct answer (or result value) that the artificial neural network must infer when the learning data is input to the artificial neural network. The unsupervised learning refers to a method of learning an artificial neural network when a label for learning data is not given. The reinforcement learning refers to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot refers to a machine that automatically processes or operates a given task by its own ability. In particular, a robot having a function of recognizing an environment and performing a self-determination operation may be referred to as an intelligent robot. Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user. For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like. At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention. The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180. The communication unit 110 can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 can acquire various kinds of data. Further, the input unit 120 may include a camera for inputting a video signal, a microphone for receiving an audio signal, and a user input unit for receiving information from a user. The camera or the microphone may be treated as a sensor, and the signal acquired from the camera or the microphone can be referred to as sensing data or sensor information.

The input unit 120 can acquire a learning data for model learning and an input data to be used when an output is acquired by using learning model. The input unit 120 can acquire raw input data. In this case, the processor 180 or the learning processor 130 can extract an input feature by preprocessing the input data.

In addition, the learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

Figure 2:
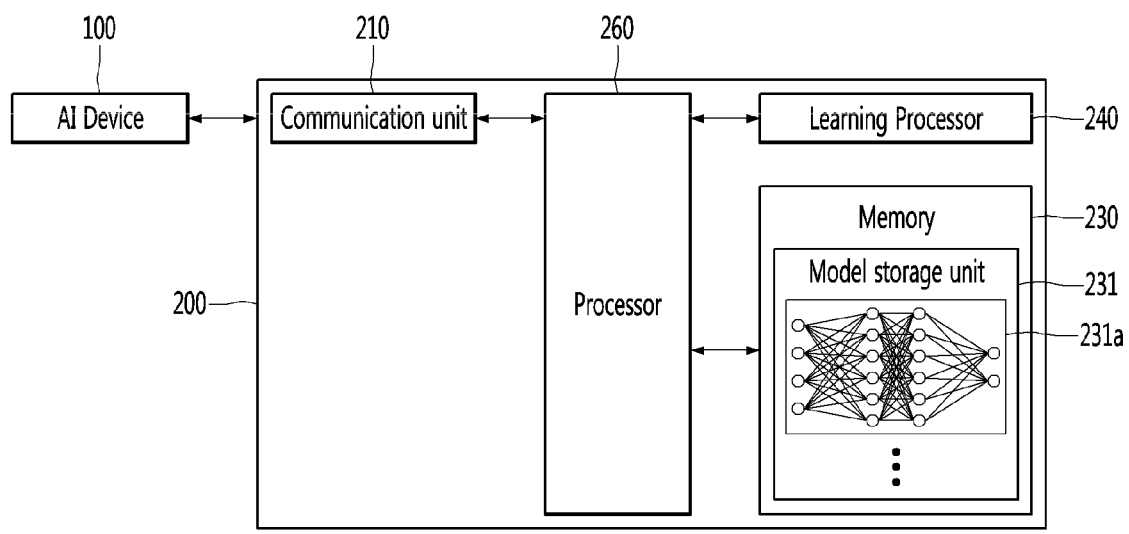
FIG. 2 illustrates an AI server 200 according to an embodiment of the present invention.

Further, the learning processor 130 can perform AI processing together with the learning processor 240 of the AI server 200 (FIG. 2). Further, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors. Examples of the sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

In addition, the output unit 150 can generate an output related to a visual sense, an auditory sense, or a haptic sense. Further, the output unit 150 may include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like. Also, the processor 180 can determine at least one executable operation of the AI device 100 based on information determined or generated by using a data analysis algorithm or a machine learning algorithm. The processor 180 can also control the components of the AI device 100 to execute the determined operation.

To this end, the processor 180 can request, search, receive, or utilize data of the learning processor 130 or the memory 170. The processor 180 can also control the components of the AI device 100 to execute the predicted operation or the operation determined to be desirable among the at least one executable operation. When the connection of an external device is required to perform the determined operation, the processor 180 can generate a control signal for controlling the external device and may transmit the generated control signal to the external device.

In addition, the processor 180 can acquire intention information for the user input and determine the user's requirements based on the acquired intention information. The processor 180 can also acquire the intention information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, be learned by the learning processor 240 of the AI server 200, or be learned by their distributed processing.

In addition, the processor 180 can collect history information including the operation contents of the AI apparatus 100 or the user's feedback on the operation and store the collected history information in the memory 170 or the learning processor 130 or transmit the collected history information to the external device such as the AI server 200. The collected history information can be used to update the learning model.

Further, the processor 180 can control at least part of the components of AI device 100 so as to drive an application program stored in memory 170. Furthermore, the processor 180 may operate two or more of the components included in the AI device 100 in combination so as to drive the application program.

Next, FIG. 2 illustrates an AI server 200 according to an embodiment of the present invention. Referring to FIG. 2, the AI server 200 refers to a device that learns an artificial neural network by using a machine learning algorithm or uses a learned artificial neural network. The AI server 200 may include a plurality of servers to perform distributed processing, or may be defined as a 5G network. Further, the AI server 200 may be included as a partial configuration of the AI device 100, and may perform at least part of the AI processing together.

The AI server 200 may include a communication unit 210, a memory 230, a learning processor 240, a processor 260, and the like. The communication unit 210 can transmit and receive data to and from an external device such as the AI device 100. The memory 230 may include a model storage unit 231. The model storage unit 231 can store a learning or learned model (or an artificial neural network 231a) through the learning processor 240.

Further, the learning processor 240 can learn the artificial neural network 231a by using the learning data. The learning model may be used in a state of being mounted on the AI server 200 of the artificial neural network, or may be used in a state of being mounted on an external device such as the AI device 100.

In addition, the learning model may be implemented in hardware, software, or a combination of hardware and software. If all or part of the learning models are implemented in software, one or more instructions that constitute the learning model may be stored in memory 230. The processor 260 can also infer the result value for new input data by using the learning model and may generate a response or a control command based on the inferred result value.

Figure 3:
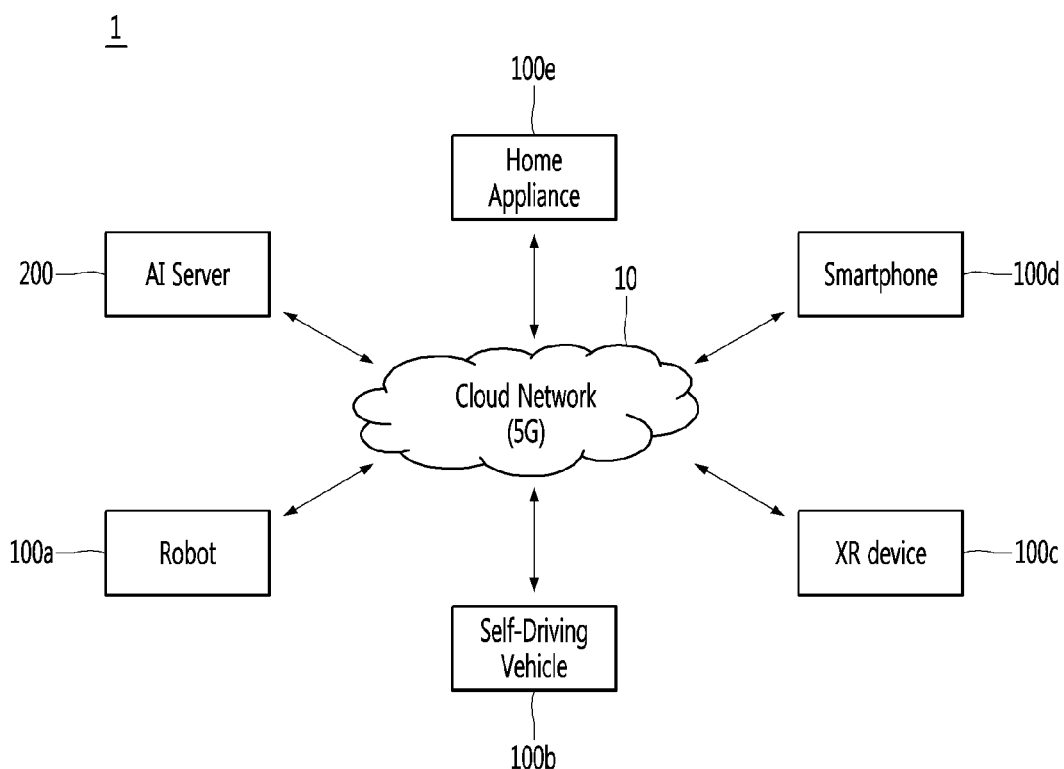
FIG. 3 illustrates an AI system 1 according to an embodiment of the present invention.

Next, FIG. 3 illustrates an AI system 1 according to an embodiment of the present invention. Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

In addition, the cloud network 10 refers to a network that forms part of a cloud computing infrastructure or exists in a cloud computing infrastructure. The cloud network 10 may be configured by using a 3G network, a 4G or LTE network, or a 5G network. That is, the devices 100a to 100e and 200 configuring the AI system 1 can be connected to each other through the cloud network 10. In particular, each of the devices 100a to 100e and 200 may communicate with each other through a base station, but may directly communicate with each other without using a base station.

Further, the AI server 200 may include a server that performs AI processing and a server that performs operations on big data. The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and assist at least part of AI processing of the connected AI devices 100a to 100e.

Further, the AI server 200 can learn the artificial neural network according to the machine learning algorithm instead of the AI devices 100a to 100e, and directly store the learning model or transmit the learning model to the AI devices 100a to 100e. Also, the AI server 200 can receive input data from the AI devices 100a to 100e, infer the result value for the received input data by using the learning model, generate a response or a control command based on the inferred result value, and transmit the response or the control command to the AI devices 100a to 100e.

Alternatively, the AI devices 100a to 100e can infer the result value for the input data by directly using the learning model, and generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like. The robot 100a may include a robot control module for controlling the operation, and the robot control module refers to a software module or a chip implementing the software module by hardware.

Further, the robot 100a can acquire state information about the robot 100a by using sensor information acquired from various kinds of sensors, detect (recognize) surrounding environment and objects, generate map data, determine the route and the travel plan, determine the response to user interaction, or determine the operation. The robot 100a can also use the sensor information acquired from at least one sensor among the lidar, the radar, and the camera so as to determine the travel route and the travel plan.

In addition, the robot 100a can perform the above-described operations by using the learning model composed of at least one artificial neural network. For example, the robot 100a can recognize the surrounding environment and the objects by using the learning model, and determine the operation by using the recognized surrounding information or object information. The learning model may also be learned directly from the robot 100a or be learned from an external device such as the AI server 200.

Further, the robot 100a can perform the operation by generating the result by directly using the learning model, but the sensor information may be transmitted to the external device such as the AI server 200 and the generated result may be received to perform the operation. The robot 100a may also use at least one of the map data, the object information detected from the sensor information, or the object information acquired from the external apparatus to determine the travel route and the travel plan, and control the driving unit such that the robot 100a travels along the determined travel route and travel plan.

Further, the map data may include object identification information about various objects arranged in the space in which the robot 100a moves. For example, the map data may include object identification information about fixed objects such as walls and doors and movable objects such as pollen and desks. Also, the object identification information may include a name, a type, a distance, and a position.

In addition, the robot 100a can perform the operation or travel by controlling the driving unit based on the control/interaction of the user. Further, the robot 100a can acquire the intention information of the interaction due to the user's operation or speech utterance, and determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like. The self-driving vehicle 100b may include a self-driving control module for controlling a self-driving function, and the self-driving control module refers to a software module or a chip implementing the software module by hardware. The self-driving control module may be included in the self-driving vehicle 100b as a component thereof, but may be implemented with separate hardware and connected to the outside of the self-driving vehicle 100b.

In addition, the self-driving vehicle 100b can acquire state information about the self-driving vehicle 100b by using sensor information acquired from various kinds of sensors, detect (recognize) surrounding environment and objects, generate map data, determine the route and the travel plan, or determine the operation. Like the robot 100a, the self-driving vehicle 100b can use the sensor information acquired from at least one sensor among the lidar, the radar, and the camera so as to determine the travel route and travel plan.

In particular, the self-driving vehicle 100b can recognize the environment or objects for an area covered by a field of view or an area over a certain distance by receiving the sensor information from external devices, or receive directly recognized information from the external devices.

Further, the self-driving vehicle 100b can perform the above-described operations by using the learning model composed of at least one artificial neural network. For example, the self-driving vehicle 100b can recognize the surrounding environment and the objects by using the learning model, and determine the traveling movement line by using the recognized surrounding information or object information. The learning model can also be learned directly from the self-driving vehicle 100a or be learned from an external device such as the AI server 200.

Further, the self-driving vehicle 100b can perform the operation by generating the result by directly using the learning model, but the sensor information may be transmitted to the external device such as the AI server 200 and the generated result may be received to perform the operation. The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

Also, the map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may also include a name, a type, a distance, and a position.

In addition, the self-driving vehicle 100b can perform the operation or travel by controlling the driving unit based on the control/interaction of the user. Further, the self-driving vehicle 100b can acquire the intention information of the interaction due to the user's operation or speech utterance, and determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c can analyze three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

The XR device 100c can also perform the above-described operations by using the learning model composed of at least one artificial neural network. For example, the XR device 100c can recognize the real object from the three-dimensional point cloud data or the image data by using the learning model, and provide information corresponding to the recognized real object. The learning model can also be directly learned from the XR device 100c, or be learned from the external device such as the AI server 200. Further, the XR device 100c can perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like. The robot 100a, to which the AI technology and the self-driving technology are applied, refers to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself. The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

In addition, the robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b. Further, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like. The robot 100a, to which the XR technology is applied, refers to a robot that is subjected to control/interaction in an XR image. In this case, the robot 100a may be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. Also, the robot 100a can operate based on the control signal input through the XR device 100c or the user's interaction. For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like. The self-driving driving vehicle 100b, to which the XR technology is applied, refers to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image can acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Further, when the XR object is output to the HUD, at least part of the XR object can be output so as to overlap the actual object to which the passenger's gaze is directed. Meanwhile, when the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, acquires the sensor information from the sensors including the camera, the self-driving vehicle 100b or the XR device 100c can generate the XR image based on the sensor information, and the XR device 100c can output the generated XR image. The self-driving vehicle 100b can also operate based on the control signal input through the external device such as the XR device 100c or the user's interaction.

Next, FIGS. 4 to 8 illustrate diagrams for describing an artificial intelligence cooking device according to an embodiment of the present invention. Hereinafter, an artificial intelligence cooking device will be described with an example of an induction heating cooking device.

The induction heating cooking device is an electric cooking device that performs a cooking function by a scheme in which a high-frequency current flows through a working coil or a heating coil, and while a strong magnetic force line generated therefrom passes through a load (or cooking vessel), an eddy current flows to heat the vessel itself. In a basic heating principle of such an induction heating cooking device, as a current is applied to the heating coil, a heating load, which is a magnetic material, generates a heat by induction heating, and the heating load itself is heated by the heat thus generated to perform cooking.

An inverter used in an induction heating cooking device switches a voltage applied to the heating coil such that a high frequency current flows through the heating coil. The inverter typically drives a switching element composed of an insulated gate bipolar transistor (IGBT), which allows a high-frequency current to flow through the heating coil to form a high-frequency magnetic field around the heating coil.

Figure 4:
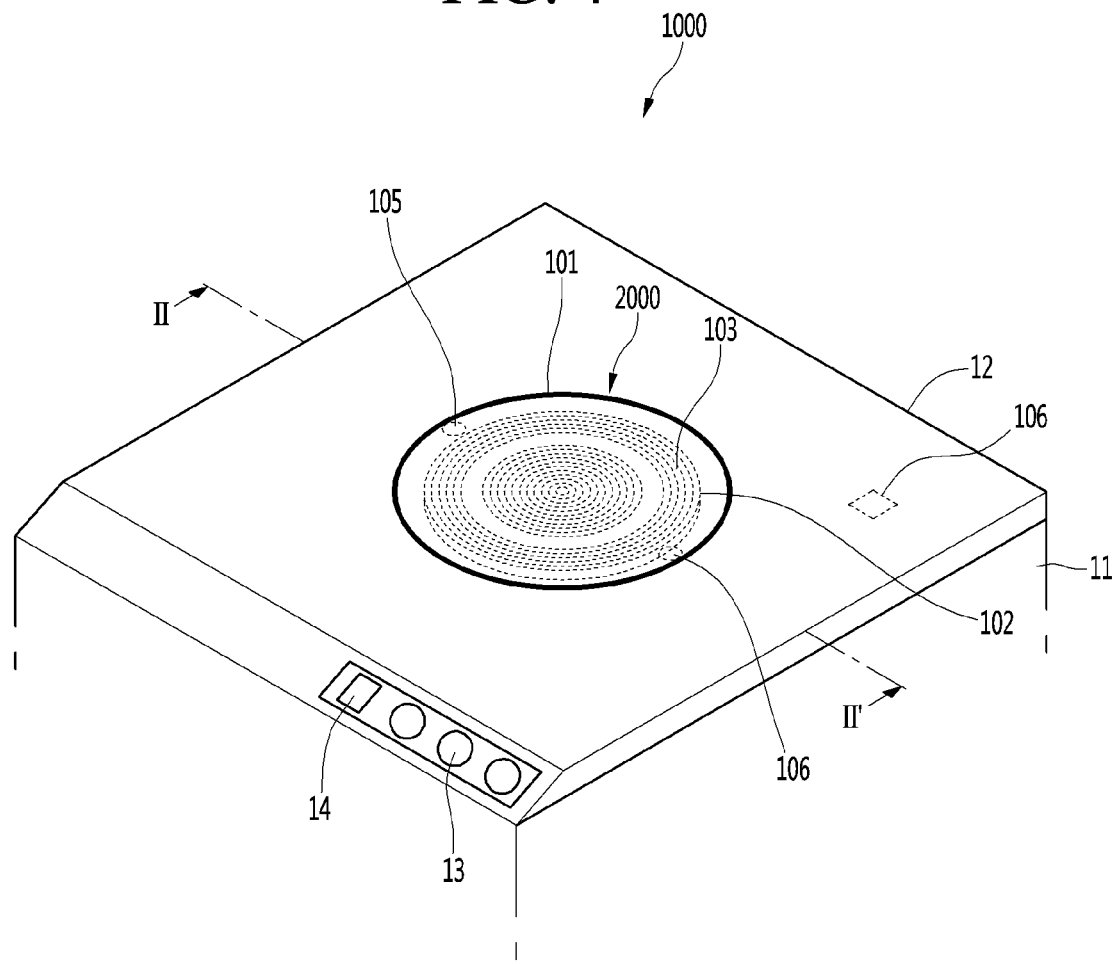
FIG. 4 is a perspective view of an induction heating cooking device according to an embodiment of the present invention.

FIG. 4 is a perspective view of an induction heating cooking device 1000 according to an embodiment of the present invention. The induction heating cooking device 1000 includes a main body 11, a plate 12, a heating region in which the heating load may be seated and heated on the plate 12, and a manipulation portion 13 for controlling an operation of the induction heating cooking device 1000 by a user. In addition, the plate 12 may be an upper plate forming an upper outer surface of the main body.

Referring to FIG. 4, the induction heating cooking device 1000 includes a main body 11 for defining an internal space therein in which a plurality of components are embedded. As shown, the main body 11 forms a lower outer surface of the induction heating cooking device 1000. The main body 11 may further include a heating portion 2000 that generates a magnetic field to provide a heat source.

Further, the main body 11 may also include a processor 180 for controlling the heating portion 2000 and a power supply 17 (FIG. 8) for supplying power to at least one of the heating portion 2000 or the processor 180. The processor 180 can also be operated based on a signal of the manipulation portion 13 to be described below. In addition, the processor 180 can transfer power of the power supply 17 to the heating portion 2000.

When power is supplied to the heating portion 2000, the cooking vessel put on the plate 12 can be heated by the magnetic field generated by the heating portion 2000. In addition, ingredients (e.g., water, food, or the like) contained in the cooking vessel can be cooked. Further, the cooking vessel may be at least partly made of a magnetic material such as iron, steel, or the like. In an example, the plate 12 can be formed to have a predetermined thickness and can also be formed of thermally tempered glass of a ceramic material to have a heat-resistant property.

In addition, a heating region 102 for cooking can be formed on an upper face of the plate 12 corresponding to the heating portion 2000. When the cooking vessel is seated on the heating region 102, the ingredients in the cooking vessel can be heated. Further, as shown in FIG. 4, the heating region 102 may be formed in a size corresponding to a size of the heating portion 2000.

As also shown in FIG. 4, a guide line 101 for guiding the cooking vessel to be seated on the heating region in place can be formed on the plate 12. In one example, when the heating portion 2000 includes a plurality of heating portions, the number of guide lines can correspond to the number of heating portions. Further, the guide line 101 may be formed in contact with an outer circumference line of the heating region or outside the outer circumference line.

Also, the plate 12 can include the manipulation portion 13 that controls an operation of the processor 180. The manipulation portion 13 may be applied in a variety of ways, including buttons, knobs, touch screens, and the like. Thus, the user can set the induction heating cooking device 1000 to be suitable for a desired purpose using the manipulation portion 13. In one example, the user can determine a heating level (or heating intensity) of the heating portion 2000 using the manipulation portion 13. Then, the heating portion 2000 can be operated at the set heating level. Also, the heating level of the heating portion 2000 can be determined by an intensity of the magnetic field applied to the heating portion 2000.

The plate 12 may further include a display 14 for displaying information and statuses of the heating portion 2000 and the load seated on the heating portion. The display 14 can also display information input to the manipulation portion 13. In one example, the display 14 can display the heating level of the heating portion 2000 set using the manipulation portion 13.

Further, the display 14 can display a message for the user to recognize when the cooking by the induction heating cooking device 1000 is stopped or an abnormality occurs in the state of the induction heating cooking device 1000. In an example, a vibration sensor module 106 can be disposed in a different region from the heating region 102 and detect a vibration of the plate 12. This will be described in detail below.

Figure 5:
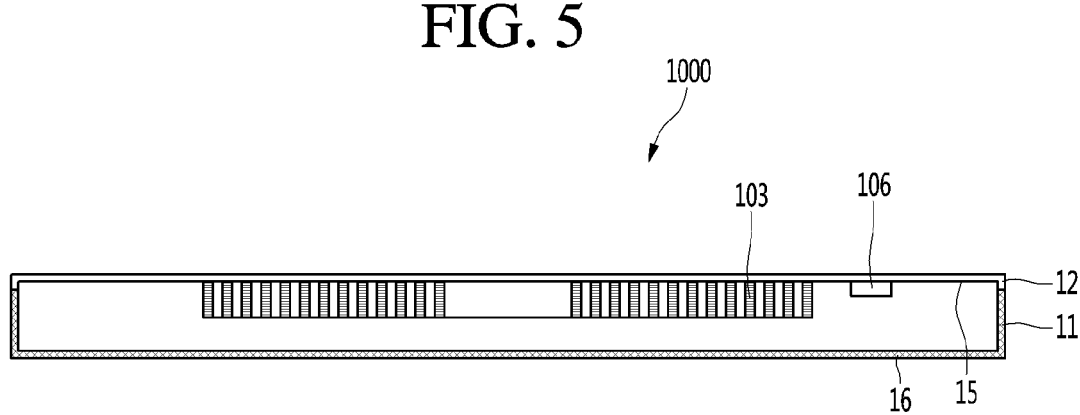
FIG. 5 is a cross-sectional view of II-II' in FIG. 4.
Figure 8:
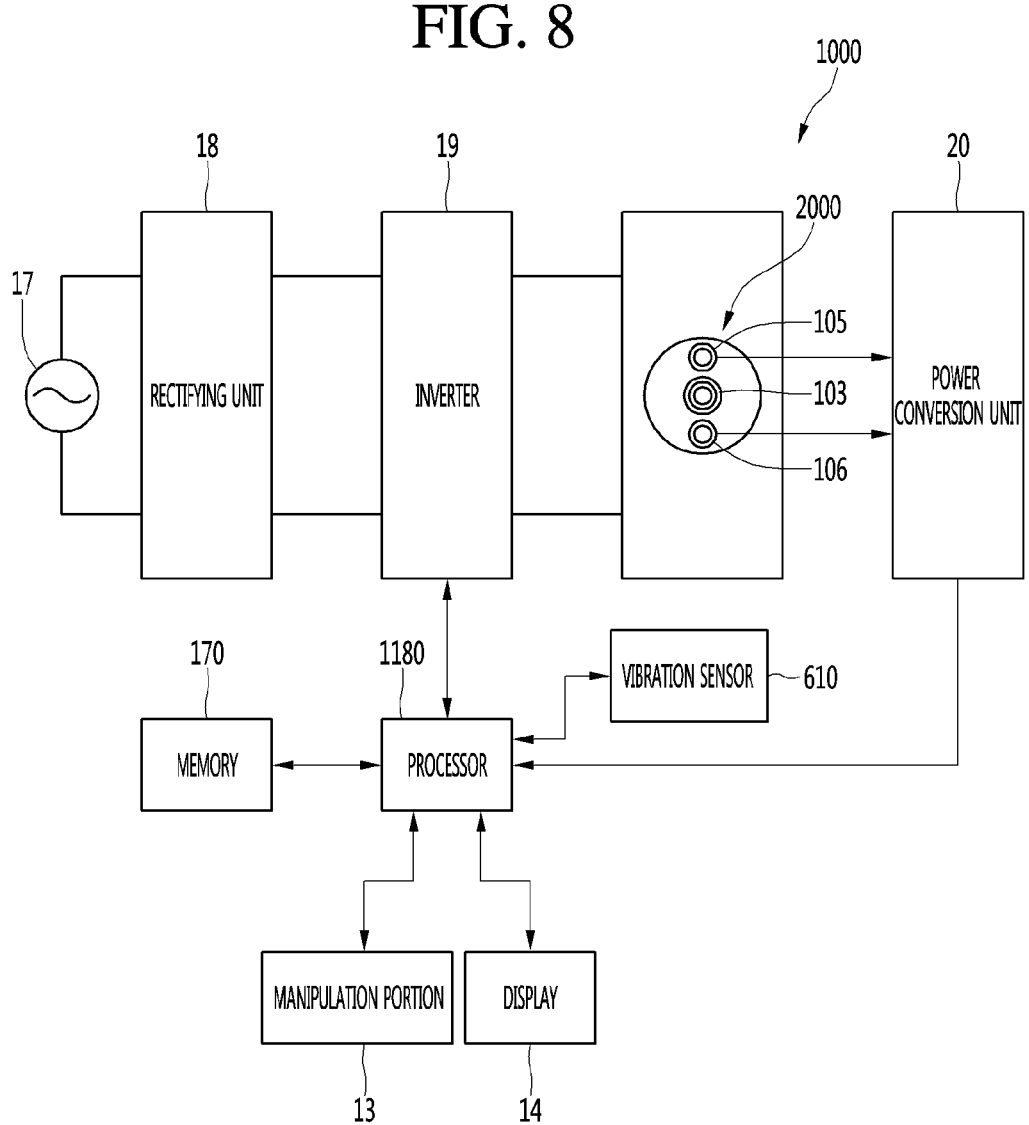
FIG. 8 is a simplified diagram illustrating a circuit configuration of an induction heating cooking device.

Next, FIG. 5 is a cross-sectional view of II-II' in FIG. 4, and FIG. 8 is a simplified diagram illustrating a circuit configuration of an induction heating cooking device 1000. As shown, the heating portion 2000 may include a working coil 103 that is an electrical induction heating element. When a current is applied to the working coil 103, a heating load, which is a magnetic material, generates heat, and then the heating load is heated by the generated heat to perform the cooking.

In an example, in order to supply the current to the working coil 103, the main body 11 may include a power conversion device for converting the power applied from the power supply 17 and supplying the converted power to the heating portion 2000. In addition, as shown in FIG. 8, the power conversion device may be an inverter 19. The inverter 19 can switch the voltage applied to the working coil 103. In addition, the high-frequency current can flow through the working coil 103 by the inverter 19.

Further, in order to supply power for driving the inverter 19, the main body 11 may further include a rectifying unit 18 for rectifying the power supplied from the power supply unit 17. In an example, the inverter 19 can be controlled by the processor 180 to switch the applied power.

In summary, the rectifying unit 18 can rectify the power supplied from the power supply unit 17 into the power to be supplied to the inverter 19. Further, the power rectified by the rectifying unit 18 can be applied to the inverter 19. Also, the inverter 19 can switch the voltage applied to the working coil 103 such that a high-frequency current flows through the working coil 103. Therefore, the high-frequency magnetic field can be formed on the working coil 103. In addition, an eddy current can flow through the heating load seated in the heating region 102 to perform the cooking.

Also, the vibration sensor module 106 can be disposed on a lower face of the plate 12. Further, the vibration sensor module 106 can be disposed in a region different from the heating region 102, that is, a region in which the heating portion is not disposed. In an example, when the cooking vessel is seated on the heating region 102 and vibrates, a vibration signal can be transmitted to the vibration sensor module 106 through the plate 12.

Figure 6:
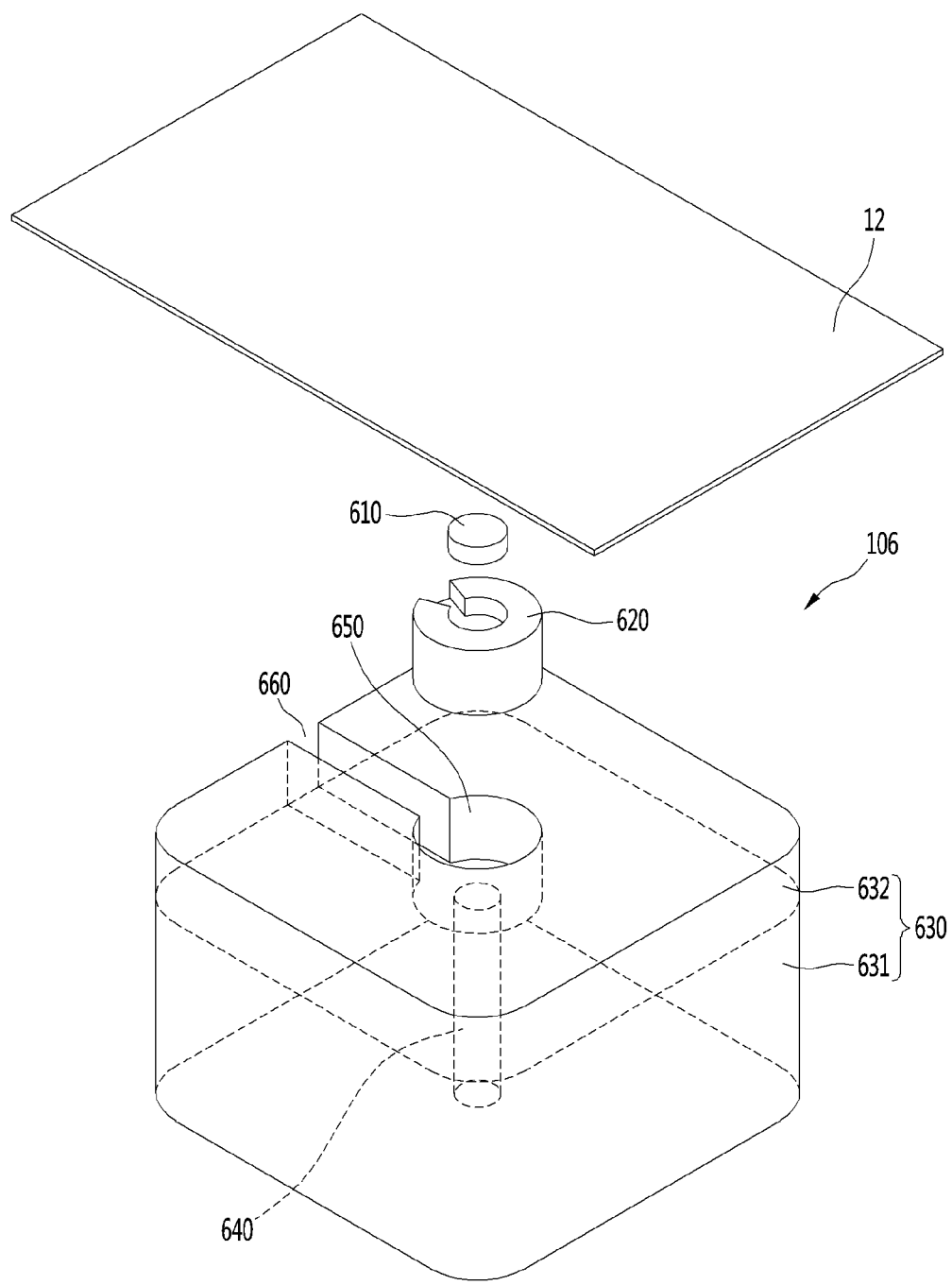
FIG. 6 is an exploded perspective view for illustrating a vibration sensor module 106 according to a first embodiment of the present invention.

In more detail, FIG. 6 is an exploded perspective view for illustrating the vibration sensor module 106 according to a first embodiment of the present invention. FIG. 6 will be described with reference to FIG. 5.

The induction heating cooking device 1000 may include the vibration sensor module 106. As shown in FIG. 6, the vibration sensor module 106 may be accommodated in the internal space of the main body 11. Specifically, the vibration sensor module 106 may be disposed in a space defined between the plate 12 and the main body 11. Accordingly, the vibration sensor module 106 can minimize sensing of a vibration signal generated from the outside of the induction heating cooking device 1000. In an example, the vibration sensor module 106 may include a vibration sensor 610 and an outer holder 630.

The outer holder 630 may be disposed below the plate 12. In this case, the outer holder 630 may be in contact with the lower face of the plate 12. Specifically, the outer holder 630 may be connected to and fixed to a lower face 15 (FIG. 5) of the plate 12. In this case, an upper face of the outer holder 630 may be in contact with the lower face 15 of the plate 12. In an example, the induction heating cooking device 1000 may include a fastening member (not shown) for connecting and fixing the outer holder 630 to the lower face 15 of the plate 12.

In an example, it is described that the outer holder 630 is connected to and fixed to the lower face 15 of the plate 12, but is not limited thereto. The outer holder 630 may be spaced apart from the lower face 15 of the plate 12. In this case, the induction heating cooking device 1000 may include a fastening member (not shown) for connecting the plate 12 or the main body 11 to the outer holder 630 and supporting the outer holder 630.

In an example, the vibration sensor 610 may be accommodated in the outer holder 630. Further, the upper face of the outer holder 630 can be opened such that an upper face of the vibration sensor 610 faces the lower face 15 of the plate 12. In addition, the opening of the upper face of the outer holder 630 can mean opening of the entire upper face of the outer holder 630 or opening of a portion of the upper face of the outer holder 630.

In this case, the upper face of the vibration sensor 610 can be spaced apart from the lower face 15 of the plate 12, or the upper face of the vibration sensor 610 can be in contact with the lower face 15 of the plate 12. In an example, the outer holder 630 surrounds side and lower portions of the vibration sensor 610. In addition, the outer holder 630 can be spaced apart from the vibration sensor 610 and surround the vibration sensor 610 or be in contact with the vibration sensor 610 and surround the vibration sensor 610. In addition, surrounding the side and lower portions of the vibration sensor 610 includes surrounding the entire side and lower portions of the vibration sensor 610 or surrounding a portion of the side and lower portions of the vibration sensor 610.

When the outer holder 630 is spaced apart from the vibration sensor 610 and surrounds the vibration sensor 610, the vibration sensor module 106 may further include a connector connected to the outer holder 630 and the vibration sensor 610 to support the vibration sensor 610. In an example, the vibration sensor module 106 may further include an inner holder 620 and a connector 640.

Further, the vibration sensor 610 may be accommodated in the inner holder 620. In this case, the inner holder 620 may surround the side and lower portions of the vibration sensor 610. In addition, surrounding the side and lower portions of the vibration sensor 610 includes surrounding the entire side and lower portions of the vibration sensor 610 or surrounding a portion of the side and lower portions of the vibration sensor 610. In one example, the inner holder 620 may be made of an elastic material. Accordingly, the inner holder 620 can reduce transmission, to the vibration sensor 610, of the vibration signal other than the vibration signal received through the plate 12.

In addition, the outer holder 630 may have a hollow structure, and the inner holder 620 can be accommodated in an internal space of the outer holder 630. In this case, the connector 640 can connect the outer holder 630 and the inner holder 620 and support the inner holder 620. In an example, the outer holder 630 may include a lower holder 631 and an upper holder 632.

As shown in FIG. 6, the upper holder 632 may include an accommodating portion 650 defined therein. In addition, the receiving portion 650 may be in a hole shape. Further, the inner holder 620 can be accommodated in the accommodating portion 620. In an example, the lower holder 631 can have a hollow structure, and the connector 640 can be disposed in an internal space defined in the lower holder 631. The connector 640 can also be connected to the inner holder 620 and the lower holder 631 and support the inner holder 620.

In an example, an opening 660 may be defined in the inner holder 620 and the outer holder 630 for exposing a portion of the side and lower faces of the vibration sensor 610 to the outside of the vibration sensor 106. In this case, a wiring for connecting the vibration sensor 610 with the processor 180 through the opening 660 may be formed.

According to the present invention, the vibration sensor module 106 is accommodated in the internal space of the main body 11. Accordingly, sensing, by the vibration sensor 610, of the vibration signal (e.g., ambient noise due to use of a cutting board, a mixer, or the like) generated from the outside of the induction heating cooking device 1000 can be minimized.

Further, according to the present invention, the outer holder 630 for receiving the vibration sensor module 106 therein is connected to and fixed to the plate 12. Accordingly, sensing, by the vibration sensor 610, of a vibration signal (e.g., vibration transmitted by the main body 11) transmitted through a structure other than the plate 12 can be minimized.

In an example, according to the present invention, the outer holder 630 is disposed in close contact with the lower face 15 of the plate 12 and surrounds the side and the lower portions of the vibration sensor 610. Accordingly, the sensing, by the vibration sensor 610, of the vibration signal (e.g., ambient noise or the like due to use of a cutting board, a mixer, or the like) generated from the outside can be minimized.

Figure 7:
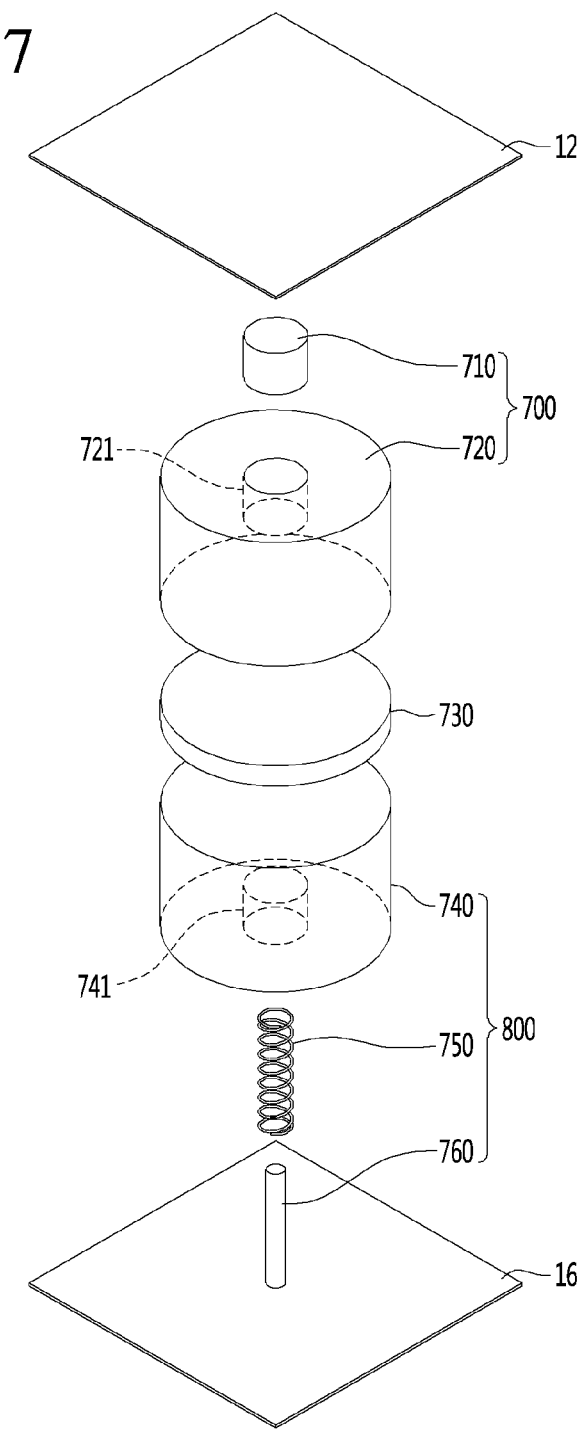
FIG. 7 is an exploded perspective view for illustrating a vibration sensor module and a pressing mechanism according to another embodiment of the present invention.

Next, FIG. 7 is an exploded perspective view for illustrating a vibration sensor module and a pressing mechanism according to another embodiment of the present invention. FIG. 7 will be described with reference to FIG. 5.

A vibration sensor module 700 may include a vibration sensor 710 and a housing 720 in which the vibration sensor is accommodated. The vibration sensor 710 can be accommodated in the housing 720. In more detail, the housing 720 may include an accommodating portion 721 defined therein, and the vibration sensor 710 can be accommodated in the accommodating portion 721.

Further, the housing 720 may surround side and lower portions of the vibration sensor 710. Also, an upper face of the housing 720 can be opened such that an upper face of the vibration sensor 710 faces the lower face 15 of plate 121n addition, the upper face of the vibration sensor 710 can be spaced apart from the lower face 15 of the plate 12 or the upper face of the vibration sensor 710 can be in contact with the lower face 15 of the plate 12. In one example, a pressing mechanism 800 may include a spring 750, a spring supporter 760, and a spring housing 740.

Further, the spring supporter 760 can be connected to a lower plate 16 of the main body 11. Further, the spring 750 may be mounted on the spring supporter 760. In this case, the spring supporter 760 can support the spring 750 such that the spring 750 faces a direction of the upper plate 12. In an example, the spring housing 740 may include a spring accommodating portion 741 defined therein, and a portion of the spring 750 can be accommodated in the spring accommodating portion 741.

In addition, the pressing mechanism 800 can press the vibration sensor module 700 toward the upper plate 12. Specifically, the vibration sensor module 700 can be disposed above the spring housing 740, and a pressure by an elastic force of the spring 750 can act toward the upper plate 12. Further, the elastic force of the spring 750 can be transmitted to the vibration sensor module 700 to press the vibration sensor module 700 toward the upper plate 12. Also, the vibration sensor module 700 can be directly connected with the pressing mechanism 800 or be indirectly connected with the pressing mechanism 800 with a vibration absorbing mechanism 730 therebetween.

In one example, the housing 720 may be disposed below the plate 12, and the housing 720 can be in contact with the lower face of plate 12 by pressing of the pressing mechanism 800. According to such a structure, transmission of the vibration signal to the vibration sensor 710 through routes other than the plate 12 can be minimized by contacting the housing with the plate 12 by the pressing of the pressing mechanism.

In addition, the vibration absorbing mechanism 730 may be composed of an elastic body such as rubber or the like. Further, the vibration absorbing mechanism 730 can absorb a vibration signal transmitted through the lower plate 16, thereby preventing the vibration signal from being transmitted to the vibration sensor 710.

Further, the artificial intelligence cooking device has been described with the example of the induction heating cooking device, but is not limited thereto. For example, the artificial intelligence cooking device described in the present invention can be applied to any product capable of heating the ingredients in the cooking vessel, such as a gas stove, an electric stove, an oven, a microwave oven, an induction, a hybrid, a highlight, and the like. The artificial intelligence cooking device may also include some or all of the components of the AI device 100 described in FIG. 1, and can perform a function performed by the AI device 100.

Figure 9:
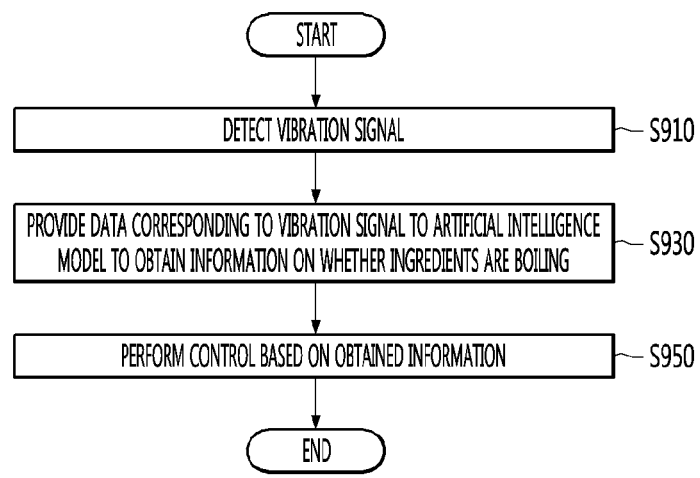
FIG. 9 is a diagram illustrating a method for operating an artificial intelligence cooking device according to an embodiment of the present invention.

Next, FIG. 9 is a diagram illustrating a method for operating an artificial intelligence cooking device according to an embodiment of the present invention. The method includes detecting the vibration signal of the ingredients in the cooking vessel (S910), providing data corresponding to the vibration signal to the artificial intelligence model to obtain information about whether the ingredients in the cooking vessel are boiling (S930), and performing control based on the obtained information (S950).

First, the vibration signal is described. The vibration signal is a physical vibration generated as the ingredients in the cooking vessel are heated. Further, at least one of a vibration intensity, a frequency, or a pattern of the vibration signal may vary based on temperature of the ingredients in the cooking vessel. Accordingly, when the ingredients in the cooking vessel are boiling, the vibration signal exhibits unique properties.

Figure 10:
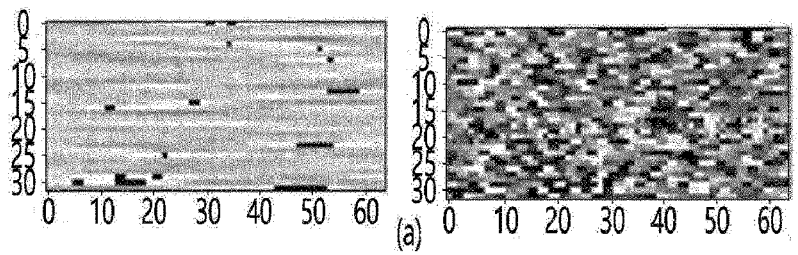
FIG. 10 illustrates 2D images of vibration signals when ingredients are boiling and of vibration signals when the ingredients are not boiling.
Figure 10:
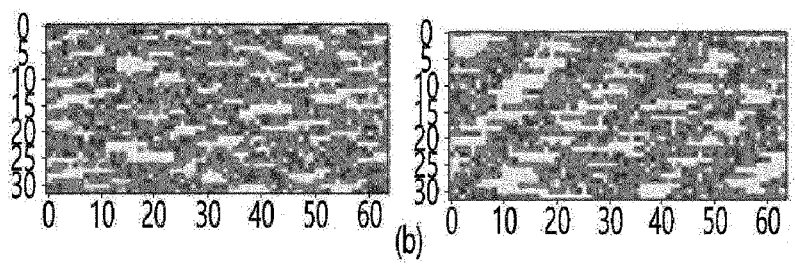
Figure 10:
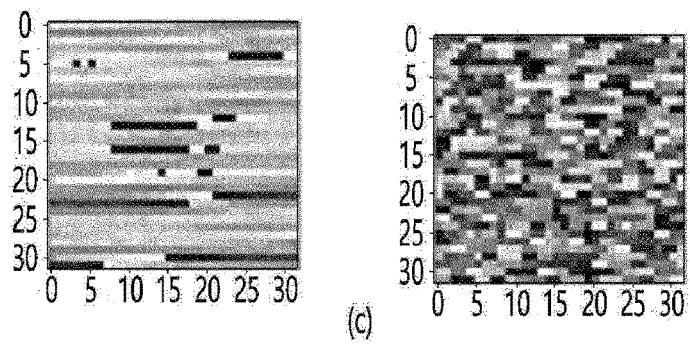
Figure 10:
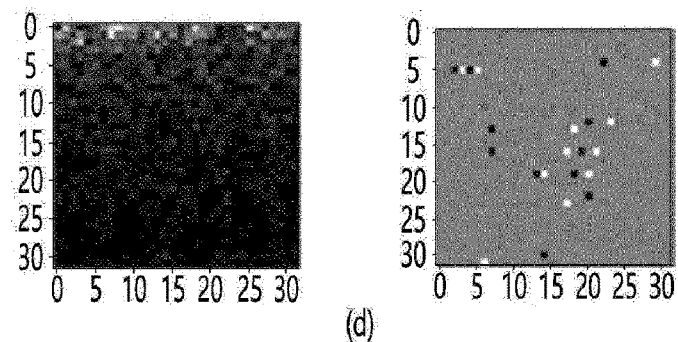
Figure 10:
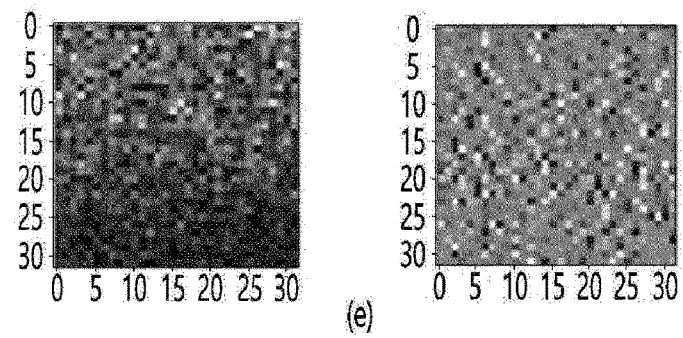

In more detail, FIG. 10 illustrates 2D images of vibration signals when ingredients are boiling and of vibration signals when the ingredients are not boiling. In FIGS. 10a-10e, vibration signals of five samples with different sizes of cooking vessels, different types of ingredients, and different amounts of ingredients are illustrated as 2D images.

Further, left images are vibration signals generated by the ingredients when the ingredients are not boiling, and right images are vibration signals generated by the ingredients when the ingredients are boiling. For example, a left image of FIG. 10a is a vibration signal detected before water in a first cooking vessel boils and a right image of FIG. 10a is a vibration signal detected while the water contained in the first cooking vessel is boiling. In another example, a left image of FIG. 10b is a vibration signal detected before soup contained in a second cooking vessel boils and a right image of FIG. 10b is a vibration signal detected while the soup contained in the second cooking vessel is boiling.

Referring to FIG. 10, it can be seen that the vibration signal when the ingredients are boiling or when the ingredients are not boiling shows different properties. This is because at least one of the intensity, frequency, or pattern of the vibration varies based on the temperature of the ingredients in the cooking vessel. Therefore, when the property of the vibration signal is extracted and analyzed when the ingredients are boiling, it is possible to determine whether the ingredients are boiling with only the vibration signal.

Figure 11:
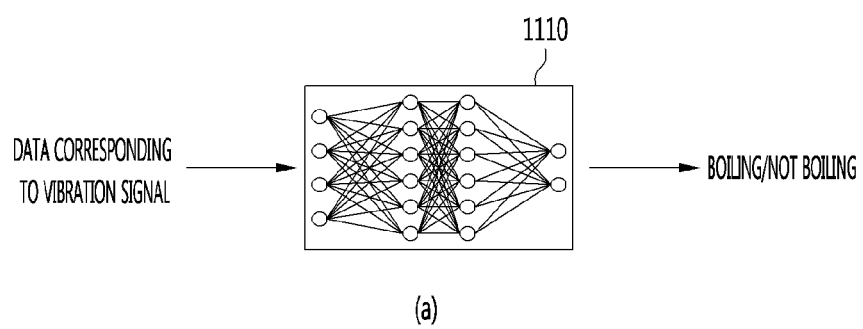
FIG. 11 illustrates diagrams for describing a method for generating an artificial intelligence model according to an embodiment of the present invention.
Figure 11:
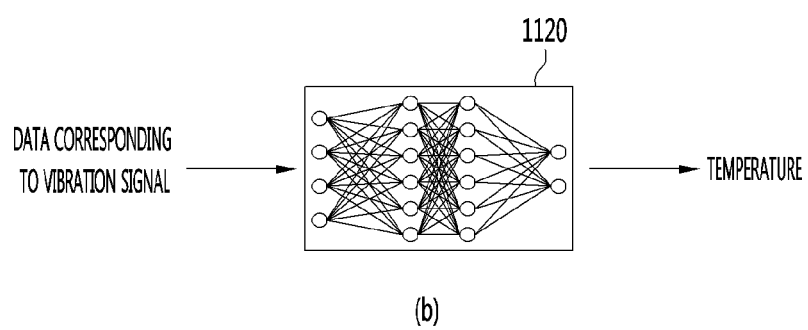

Next, FIG. 11 includes diagrams illustrating a method for generating an artificial intelligence model according to an embodiment of the present invention. First, artificial intelligence will be briefly described. Artificial intelligence (AI) is one field of computer engineering and information technology for studying a method of enabling a computer to perform thinking, learning, and self-development that can be performed by human intelligence and may denote that a computer imitates an intelligent action of a human.

In addition, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program. In more detail, machine learning includes a technology which studies and establishes a system for performing learning based on experiential data, performing prediction, and autonomously enhancing performance and algorithms relevant thereto. Algorithms of machine learning can use a method which establishes a specific model for obtaining prediction or decision based on input data, rather than a method of executing program instructions which are strictly predefined.

The term "machine learning" can be referred to as "machine learning." In machine learning, a number of machine learning algorithms for classifying data have been developed. Decision tree, Bayesian network, support vector machine (SVM), and artificial neural network (ANN) are representative examples of the machine learning algorithms.

In addition, the decision tree is an analysis method of performing classification and prediction by schematizing a decision rule into a tree structure. Further, the Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression. The ANN is a model which implements the operation principle of biological neuron and a connection relationship between neurons and is an information processing system where a plurality of neurons called nodes or processing elements are connected to one another in the form of a layer structure.

Also, the ANN is a model used for machine learning and is a statistical learning algorithm inspired from a neural network (for example, brains in a central nervous system of animals) of biology in machine learning and cognitive science. In more detail, the ANN may denote all models where an artificial neuron (a node) of a network which is formed through a connection of synapses varies a connection strength of synapses through learning, thereby obtaining an ability to solve problems.

The term "ANN" can be referred to as "neural network." In addition, the ANN may include a plurality of layers, and each of the plurality of layers may include a plurality of neurons. Also, the ANN may include a synapse connecting a neuron to another neuron.

Further, the ANN can be generally defined by the following factors: (1) a connection pattern between neurons of a different layer; (2) a learning process of updating a weight of a connection; and (3) an activation function for generating an output value from a weighted sum of inputs received from a previous layer. The ANN may asp include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as layer." The ANN may be categorized into single layer neural networks and multilayer neural networks, based on the number of layers. General single layer neural networks are configured with an input layer and an output layer.

Further, general multilayer neural networks are configured with an input layer, at least one hidden layer, and an output layer. The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron can be activated and may output an output value obtained through an activation function.

Also, the DNN including a plurality of hidden layers between an input layer and an output layer may be a representative ANN which implements deep learning which is a kind of machine learning technology. The term "deep learning" can be referred to as "deep learning."

In addition, the ANN can be trained by using training data. Here, training can denote a process of determining a parameter of the ANN, for achieving purposes such as classifying, regressing, or clustering input data. A representative example of a parameter of the ANN includes a weight assigned to a synapse or a bias applied to a neuron. An ANN trained based on training data can also classify or cluster input data, based on a pattern of the input data.

In this specification, an ANN trained based on training data can be referred to as a trained model. Next, a learning method of an ANN will be described. The learning method of the ANN can be largely classified into supervised learning, unsupervised learning, semi-supervised learning, and reinforcement learning.

Further, the supervised learning may be a method of machine learning for analogizing one function from training data. Moreover, in analogized functions, a function of outputting continual values can be referred to as regression, and a function of predicting and outputting a class of an input vector may be referred to as classification.

In the supervised learning, an ANN can be trained in a state where a label of training data is assigned. Here, the label can denote a right answer (or a result value) to be inferred by an ANN when training data is input to the ANN. In this specification, a right answer (or a result value) to be inferred by an ANN when training data is input to the ANN may be referred to as a label or labeling data.

Also, in this specification, a process of assigning a label to training data for learning of an ANN can be referred to as a process which labels labeling data to training data. In this case, training data and a label corresponding to the training data can configure one training set and may be inputted to an ANN in the form of training sets.

Training data can represent a plurality of features, and a label being labeled to training data may denote that the label is assigned to a feature represented by the training data. In this case, the training data may represent a feature of an input object as a vector type.

An ANN can analogize a function corresponding to an association relationship between training data and labeling data by using the training data and the labeling data. Also, a parameter of the ANN can be determined (optimized) through evaluating the analogized function.

The unsupervised learning is a kind of machine learning, and in this case, a label may not be assigned to training data. In detail, the unsupervised learning can be a learning method of training an ANN so as to detect a pattern from training data itself and classify the training data, rather than to detect an association relationship between the training data and a label corresponding to the training data.

Examples of the unsupervised learning include clustering and independent component analysis. In this specification, the term "clustering" can be referred to as "clustering". Examples of an ANN using the unsupervised learning include a generative adversarial network (GAN) and an autoencoder (AE).

The GAN is a method of improving performance through competition between two different AIs called a generator and a discriminator. In this case, the generator is a model for creating new data and generates new data, based on original data. Moreover, the discriminator is a model for recognizing a pattern of data and determines whether inputted data is original data or fake data generated from the generator.

Moreover, the generator can be trained by receiving and using data which does not deceive the discriminator, and the discriminator can be trained by receiving and using deceived data generated by the generator. Therefore, the generator can evolve so as to deceive the discriminator as much as possible, and the discriminator can evolve so as to distinguish original data from data generated by the generator.

The AE is a neural network for reproducing an input as an output. The AE may include an input layer, at least one hidden layer, and an output layer. In this case, the number of node of the hidden layer may be smaller than the number of nodes of the input layer, and thus, a dimension of data can be reduced, whereby compression or encoding can be performed.

In addition, data output from the hidden layer can enter the output layer. In this case, the number of nodes of the output layer may be larger than the number of nodes of the hidden layer, and thus, a dimension of the data may increase, and thus, decompression or decoding can be performed.

The AE can control the connection strength of a neuron through learning, and thus, input data can be expressed as hidden layer data. In the hidden layer, information can be expressed by using a smaller number of neurons than those of the input layer, and input data being reproduced as an output can denote that the hidden layer detects and expresses a hidden pattern from the input data.

The semi-supervised learning is a kind of machine learning and can denote a learning method which uses both training data with a label assigned thereto and training data with no label assigned thereto. As a type of semi-supervised learning technique, there is a technique which infers a label of training data with no label assigned thereto and performs learning by using the inferred label, and such a technique can be usefully used for a case where the cost expended in labeling is large.

The reinforcement learning can be a theory where, when an environment where an agent is capable of determining an action to take at every moment is provided, the best way is obtained through experience without data. The reinforcement learning can be performed by a Markov decision process (MDP).

To describe the MDP, firstly an environment where pieces of information needed for taking a next action of an agent can be provided, secondly an action which is to be taken by the agent in the environment can be defined, thirdly a reward provided based on a good action of the agent and a penalty provided based on a poor action of the agent can be defined, and fourthly an optimal policy can be derived through experience which is repeated until a future reward reaches a highest score.

A structure of the artificial neural network can be specified by a model composition, an activation function, a loss function or cost function, a learning algorithm, an optimization algorithm, or the like, a hyperparameter may be preset before learning, and then a model parameter is set through the learning to specify a model. A structure of the artificial neural network may be specified by a model composition, an activation function, a loss function or cost function, a learning algorithm, an optimization algorithm, or the like, a hyperparameter may be preset before learning, and then a model parameter is set through the learning to specify a model.

For example, elements for determining the structure of the artificial neural network may include the number of hidden layers, the number of hidden nodes included in each hidden layer, an input feature vector, a target feature vector, and the like. The hyperparameter includes various parameters that must be set initially for the learning, such as an initial value or the like of the model parameter. In addition, the model parameter includes various parameters to be determined through the learning.

For example, the hyperparameter may include an initial weight value between nodes, an initial bias value between nodes, a mini-batch size, the number of the learning repetitions, a learning rate, or the like. In addition, the model parameter may include a weight value between nodes and a bias value between nodes.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function. The loss function may mainly use a mean squared error (MSE) or a cross entropy error (CEE), but the present invention is not limited thereto.

The CEE can be used when a correct answer label is one-hot encoded. One-hot encoding is an encoding method for setting a correct answer label value to 1 for only neurons corresponding to a correct answer and setting a correct answer label to 0 for neurons corresponding to a wrong answer. A learning optimization algorithm can be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state. The direction of adjusting model parameters is referred to as a step direction and the size of adjustment is referred to as a step size.

In this case, the step size can mean the learning rate. The gradient descent scheme can obtain a slope by partial-differentiate the loss function with each model parameter, and can change the model parameters by the learning rate in an obtained gradient direction to update the model parameters. The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results. The artificial intelligence model according to an embodiment of the present invention can be trained to predict whether the ingredients are boiling or can be trained to predict the temperature of the ingredients.

First, a method for training the artificial intelligence model to predict whether the ingredients are boiling will be described. The training apparatus 200 can train a neural network 1110 by labeling information on whether the ingredients are boiling on data corresponding to the vibration signal.

Specifically, the training apparatus 200 can detect the vibration signal using the vibration sensor and convert the detected vibration signal into the data corresponding to the vibration signal. In addition, the training apparatus 200 can train the neural network using, as an input value, the data corresponding to the vibration signal and using, as an output value, a status of the ingredients (ingredients are boiling or not boiling) when the vibration signal is generated. In addition, the status of the ingredients (ingredients are boiling or not boiling) may be a correct answer that the neural network should infer using the data corresponding to the vibration signal.

Therefore, the training apparatus 200 can provide, to the neural network, the information on whether the ingredients are boiling (boiling or not boiling) labeled on the data corresponding to the vibration signal. In this case, the neural network can infer a function of a correlation between the data corresponding to the vibration signal and the information on whether the ingredients are boiling using the data corresponding to the vibration signal and the information on whether the ingredients are boiling (boiling or not boiling). Further, parameters (weight, bias, or the like) of the neural network can be determined (optimized) through an evaluation of the function inferred by the neural network.

In an example, the training apparatus 200 can train the neural network using data corresponding to a predetermined time period. Specifically, the vibration signal can be detected in time series while the ingredients are being heated. Therefore, the data corresponding to the vibration signal can also be data collected in time series.

In this case, the training apparatus 200 can separate the data collected in time series in the predetermined time period and label the information on whether the ingredients are boiling on the separated data to train the neural network. For example, the training apparatus 200 can separate the data collected in time series on a 1 second basis. Then, the training apparatus 200 can label the information on whether the ingredients are boiling on data corresponding to a time period of 1 second to train the neural network, and then label the information on whether the ingredients are boiling on data corresponding to a next time period of 1 second to train the neural network.

In an example, the training apparatus 200 can train the neural network using various types of cooking vessel, various kinds of ingredients, vibration signals generated from various amounts of ingredients, and state of ingredients (ingredients are boiling or not boiling) when the vibration signal occurs.

In addition, the variety of types of the cooking vessels can mean that at least one of a shape, a form, a size, or a material of the cooking vessel is different. Further, the variety of the ingredients can mean that the ingredients (e.g., water, soup, steamed, jigae, porridge, stew, etc.) are different.

Further, the variety of amounts of the ingredients can mean that mass of volume of the ingredient is different. In an example, the training apparatus 200 can convert the vibration signal detected by the vibration sensor into vibration data, and train the neural network using the vibration data corresponding to the vibration signal. In this case, the vibration data can represent the vibration signal in a variety of formats.

In one example, the vibration data can be data represented in a time domain by sampling the vibration signal. In another example, the vibration data can be data in which the vibration signal is sampled and then Fourier transformed to be represented in a frequency domain. In still another example, the vibration data can be data represented in the time domain by sampling and differentiating the vibration signal. In another example, the vibration data can be data represented in the frequency domain by sampling, differentiating, and fast Fourier transforming the vibration signal.

In another example, an image representing the properties (amplitude, frequency, pattern, etc.) of the vibration signal, for example, the 2D image shown in FIG. 10 can be used as training data provided to the neural network. That is, all kinds of data that can represent the properties (amplitude, frequency, pattern, etc.) of the vibration signal can be used as the training data of the neural network.

Next, a method for training the artificial intelligence model to predict a temperature of the ingredients will be described with reference to FIG. 11*b*. Further, only differences from those described in FIG. 11*a* will be described. The training apparatus 200 can train the neural network 1120 using, as an input value, the data corresponding to the vibration signal and using, as an output value, a temperature of the ingredients when the vibration signal is generated. In addition, the temperature of the ingredients can be a correct answer that the neural network should infer using the data corresponding to the vibration signal.

Therefore, the training apparatus 200 can provide, to the neural network, temperature information labeled on the data corresponding to the vibration signal. In this case, the neural network can infer a function of a correlation between the data corresponding to the vibration signal and the temperature information using the data corresponding to the vibration signal and the temperature information. Further, parameters (weight, bias, or the like) of the neural network can be determined (optimized) through an evaluation of the function inferred by the neural network.

Further, the training apparatus 200 can separate data collected in time series in the predetermined time period and label the temperature information on the separated data to train the neural network. In an example, the temperature may not be classified into classes, such as boiling or not boiling, but may be expressed as a consecutive value. Thus, the neural network can be trained using a regression algorithm.

In an example, a neural network trained in such manner can be referred to as an artificial intelligence model. In an example, the artificial intelligence model can be mounted in the artificial intelligence cooking device. Specifically, the artificial intelligence model can be implemented in hardware, software, or a combination of the hardware and the software. Further, when a portion or an entirety of the artificial intelligence model is implemented in the software, at least one instruction that configures the artificial intelligence model can be stored in the memory 170 of the artificial intelligence cooking device.

In an example, when the neural network is trained using the data corresponding to the vibration signal, such data can be referred to as training data corresponding to the vibration signal.

Figure 12:
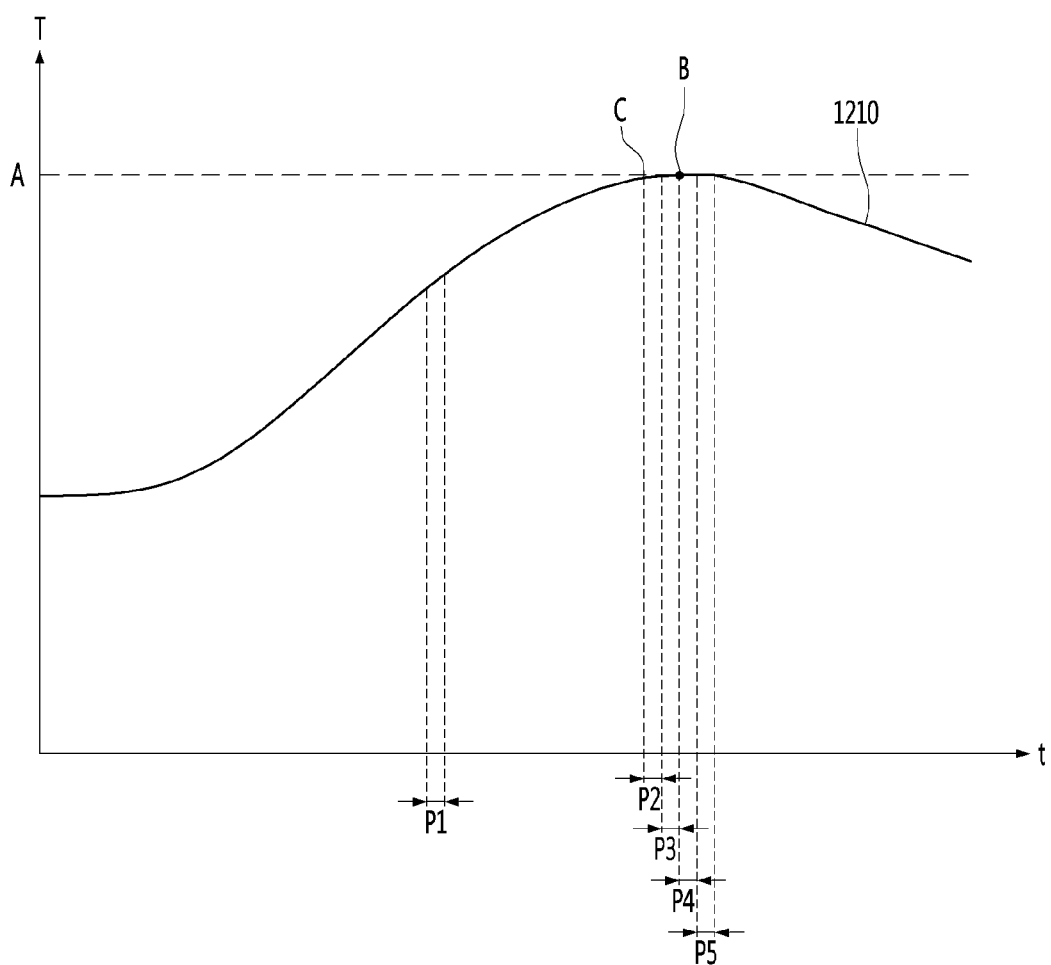
FIG. 12 is a view for illustrating a method for determining whether ingredients in a cooking vessel are boiling, according to an embodiment of the present invention.

Next, FIG. 12 is a view illustrating a method for determining whether ingredients in a cooking vessel are boiling, according to an embodiment of the present invention. The vibration sensor 610 can detect the vibration signal of the ingredients in the cooking vessel. For example, the vibration sensor 610 can be a microphone. In addition, the vibration sensor 610 can detect a vibration signal transmitted through at least one of the cooking vessel, the plate 12, or air.

However, the vibration sensor 610 is not limited to the microphone. Further, various schemes capable of detecting the vibration of the ingredients in the cooking vessel can be used to drive the vibration sensor 610. In an example, the processor 180 can obtain the data corresponding to the vibration signal.

Specifically, the processor 180 can convert the vibration signal detected using the vibration sensor 610 into the data corresponding to the vibration signal. In addition, the data corresponding to the vibration signal may be the feature vector representing at least one of the intensity, frequency, and pattern of the vibration.

In this case, the processor 180 can convert the vibration signal into data having the same format as the data used as the training data of the artificial intelligence model. For example, when the artificial intelligence model is generated using, as the training data, the data represented in the time domain by sampling the vibration signal, the processor 180 can sample the vibration signal detected by the vibration sensor 610 and convert the sampled vibration signal into the data represented in the time domain.

In an example, when the artificial intelligence model is generated using the data in the predetermined time period as the training data, the processor 180 can provide the artificial intelligence model with the data in the predetermined time domain. Specifically, the vibration signal can be detected in time series while the ingredients in the cooking vessel are heated. Therefore, the data corresponding to the vibration signal can also be the data collected in time series.

Further, the processor 180 can separate the data collected in time series in the predetermined time period. For example, when the artificial intelligence model is generated using data corresponding to a time period of 1 second as the training data, the processor 180 can separate the data collected in time series on a 1 second basis, and then input the data corresponding to the time period of 1 second into the artificial intelligence model.

In an example, a plurality of time periods may be consecutive, but is not limited thereto. The plurality of time periods may not be consecutive and may overlap each other. For example, when the plurality of time periods are consecutive, data corresponding to a first time period may be data corresponding to a vibration signal of a time period of 500 seconds to 501 seconds from a time when heating is started and data corresponding to a second time period may be data corresponding to a vibration signal of a time period of 501 seconds to 502 seconds from the time when the heating is started.

In another example, when the plurality of time periods are not consecutive, data corresponding to the first time period may be data corresponding to the vibration signal of the time period of 500 seconds to 501 seconds from the time when the heating is started and data corresponding to the second time period may be data corresponding to a vibration signal of a time period of 502 seconds to 503 seconds from the time when the heating is started.

In still another example, when the plurality of time periods are overlapped with each other, data corresponding to the first time period may be data corresponding to the vibration signal of the time period of 500 seconds to 501 seconds from the time when the heating is started and data corresponding to the second time period may be data corresponding to a vibration signal of a time period of 500.5 seconds to 501.5 seconds from the time when the heating is started.

In an example, it was described that the data corresponding to the vibration signal is data collected in time series. Further, the processor 180 can provide the data corresponding to the vibration signal to the artificial intelligence model in real time.

Specifically, when data corresponding to a predetermined time period is obtained, the processor 180 can input the data corresponding to the predetermined time period into the artificial intelligence model in real time. For example, when the predetermined time period is assumed as 1 second, the processor can input data of a time period of 500 seconds to 501 seconds into the artificial intelligence model as soon as the data of the time period of 500 seconds to 501 seconds is obtained and then can input data of a time period of 501 seconds to 502 seconds into the artificial intelligence model as soon as the data of the time period of 501 seconds to 502 seconds is obtained.

In an example, the processor 180 can sequentially input data of a plurality of time periods into the artificial intelligence model based on a time sequence of the plurality of time periods. For example, when the first time period is 500 seconds to 501 seconds, the second time period is 501 seconds to 502 seconds, and the third time period is 502 seconds to 503 seconds, the processor 180 can sequentially input data corresponding to the first time period, data corresponding to the second time period, and data corresponding to the third time period into the artificial intelligence model.

In other words, according to the present invention, the data corresponding to the vibration signals are processed in real time and sequentially input into the artificial intelligence model, so that the information on whether the ingredients are boiling can be obtained as soon as possible.

In an example, the processor 180 can provide the data corresponding to the vibration signal to the artificial intelligence model to obtain the information on whether the ingredients in the cooking vessel are boiling. Specifically, the processor 180 can provide the data corresponding to the vibration signal to the artificial intelligence model.

In addition, the artificial intelligence model can be the neural network trained using the information on whether the ingredients are boiling as labeling data. In this case, the artificial intelligence model can output a result value, for example, a score or a probability corresponding to each of a plurality of classes (boiling/not boiling).

Then, the processor can obtain the information on whether the ingredients in the cooking vessel are boiling based on the result value output from the artificial intelligence model using the data provided to the artificial intelligence model. For example, when the artificial intelligence model outputs a probability of 97% that the ingredients are boiling, the processor 180 can determine that the ingredients in the cooking vessel are boiling.

Next, a method for operating an artificial intelligence cooking device will be described in chronological order with reference to FIG. 12, which illustrates a change in temperature T of the ingredients over time t.

The processor 180 can input data corresponding to a first time period P1 into the artificial intelligence model. In this case, the artificial intelligence model can output information (or a probability value) indicating that the ingredients are not boiling. Accordingly, the processor 180 can determine that the ingredients are not boiling. Then, the processor 180 can repeat such a process.

In addition, a temperature of the ingredients reached a boiling point A and started boiling at a certain time point B. Then, the processor 180 can input data corresponding to a fourth time period P4 into the artificial intelligence model. In this case, the artificial intelligence model outputs a result value. Then, the processor 180 can determine that the ingredients in the cooking vessel are boiling based on a probability of boiling of the ingredients in the cooking vessel, which is equal to or higher than a predetermined value.

A following table shows an accuracy of the prediction of the artificial intelligence model trained b variously combining four samples with vibration signals.

TABLE 1

|  | Condition A training data | Condition B training data | Condition C training data | Condition D training data | Total |
|---|---|---|---|---|---|
| Condition A test data | 96.10% | 97.07% | 98.13% | 97.72% | 97.80% |
| Condition B test data | 96.03% | 97.40% | 96.03% | 96.72% | 95.95% |
| Condition C test data | 93.27% | 96.54% | 97.12% | 97.79% | 97.60% |
| Condition D test data | 95.31% | 97.08% | 97.17% | 98.32% | 97.43% |
| Total | 95.27% | 97.05% | 97.09% | 97.60% | 97.15% |

Referring to Table 1, condition A training data means that the neural network was trained using a vibration signal acquired under a condition A (e.g., 500 ml of water). Further, condition B training data means that the neural network was trained using a vibration signal acquired under a condition B (e.g., 1000 ml of soup).

Further, condition A test data means that the vibration signal obtained under the condition A was input into the trained neural network to measure the accuracy. Further, condition B test data means that the vibration signal obtained under the condition B was input into the trained neural network to measure the accuracy.

Referring to Table 1, a tendency that shows a high accuracy is obtained when the vibration signal of the condition A is input to the neural network trained using the vibration signal of the condition A (96.10% accuracy), when the vibration signal of the condition B is input to the neural network trained using the vibration signal of the condition B (97.40% accuracy), when a vibration signal of a condition C is input to a neural network trained using the vibration signal of the condition C (97.12% accuracy), and when a vibration signal of a condition D is input to a neural network trained using the vibration signal of the condition D (98.32% accuracy). This can mean that the neural network is trained using the training data, so that the parameters (weight, bias, or the like) of the neural network are optimized.

Further, referring to Table 1, a tendency that shows a high accuracy is obtained when the vibration signal of the condition A is input to a neural network trained using the vibration signals of the conditions A, B, C, and D (97.80% accuracy), When the vibration signal of the condition B is input to the neural network trained using vibration signals of the conditions A, B, C, and D (95.95% accuracy), when the vibration signal of the condition C is input to the neural network trained using the vibration signals of the conditions A, B, C, and D (97.60% accuracy), and when the vibration signal of the condition D is input to the neural network trained using the vibration signals of the conditions A, B, C, and D (97.43% accuracy). This can mean that the neural network is trained using various training data, so that the parameters (weight, bias, or the like) of the neural network can be further optimized.

Further, referring to Table 1, when a test is performed by inputting the vibration signal of the condition A, the vibration signal of the condition B, the vibration signal of the condition C, and the vibration signal of the condition D to the neural network trained using the vibration signals of the conditions A, B, C, and D, a total accuracy was 97.15%. This indicates that the trained neural network can predict whether the ingredients are boiling with a very accurate probability in various situations.

As such, according to the present invention, since whether the ingredients are boiling is determined using the artificial intelligence model, which learned the properties of the vibration (intensity, frequency, and pattern) generated by the boiling of the ingredients, the accuracy of the determination on whether the ingredients are boiling can be improved.

Further, according to the present invention, data of a predetermined time period (e.g., 1 second) is input to the artificial intelligence model. Then, the artificial intelligence model can determine whether the ingredients are boiling by considering only data of a current time period (that is, without considering data of a previous time period together). That is, the present invention can be much less likely to misjudge and show a higher accuracy in the determination on whether the ingredients are boiling, compared to U.S. Pat. No. 9,395,078, which detects boiling by extracting a property based on a change in vibration signals in a chronological order.

Further, according to the present invention, despite the change in the type of the ingredients, the type of the cooking vessel, the amount of the ingredients, or the like, the accurate prediction on whether the ingredients are boiling can be achieved. Further, according to the present invention, since the vibration signal only needs to be processed in a usual signal processing scheme and then input into the artificial intelligence model, a processing algorithm can be simplified.

In an example, inputting data into the artificial intelligence model continuously from a time period (e.g., P1) where a temperature is very low can add a processing load of the artificial intelligence model. Accordingly, the processor 180 can provide the artificial intelligence model with data corresponding to the vibration signal when the vibration intensity is greater than or equal to a certain level.

For example, the higher the temperature of the ingredients, the greater the intensity of the vibration. Further, when it is detected at a certain time point c that the intensity of the vibration is greater than or equal to the certain level, the processor 180 can input data corresponding to time periods P2, P3, P4, and P5 after the certain time point c into the artificial intelligence model.

In an example, the processor 180 can input data of a plurality of consecutive time periods into the artificial intelligence model and consider information obtained by inputting the data of the plurality of consecutive time periods into the artificial intelligence model to determine that the ingredients in the cooking vessel are boiling. Specifically, the processor 180 can provide the data of the fourth time period P4 to the artificial intelligence model to obtain first information on whether the ingredients in the cooking vessel are boiling.

Further, the processor 180 can provide data of a fifth time period P5, which is a next time period after the fourth time period P4, to the artificial intelligence model to obtain second information on whether the ingredients in the cooking vessel are boiling. Further, the processor 180 can determine whether the ingredients in the cooking vessel boil using the first information and the second information.

Specifically, when the first information and the second information indicate that the ingredients in the cooking vessel are boiling, the processor 180 can determine that the ingredients in the cooking vessel are boiling. Further, when the first information indicates that the ingredients in the cooking vessel are boiling, but the second information indicates that the ingredients in the cooking vessel are not boiling, the processor 180 can determine that the ingredients in the cooking vessel are not boiling.

In an example, the processor 180 can provide data of a sixth time period, which is a next time period of the fifth time period P5, to the artificial intelligence model with data of a sixth time period to obtain third information on whether the ingredients in the cooking vessel are boiling. Further, when the first information indicates that the ingredients in the cooking vessel are boiling, but the second information indicates that the ingredients in the cooking vessel are not boiling, the processor 180 can determine whether the ingredients in the cooking vessel are boiling using the second information and the third information. For example, when both the second information and the third information indicate that the ingredients in the cooking vessel are boiling, the processor 180 can determine that the ingredients in the cooking vessel are boiling.

It is assumed that the artificial intelligence model has a probability of 97% of achieving the accurate prediction. 97% is a very high probability, but there is also a 3% probability of making a wrong prediction. However, according to the present invention, when all of the information obtained corresponding to the data of the plurality of consecutive time periods indicate that the ingredients in the cooking vessel are boiling, it is determined that the ingredients in the cooking vessel are boiling. Therefore, the accuracy of the prediction can be further improved. In an example, the processor 180 can perform control based on the information on whether the ingredients in the cooking vessel are boiling.

Figure 13:
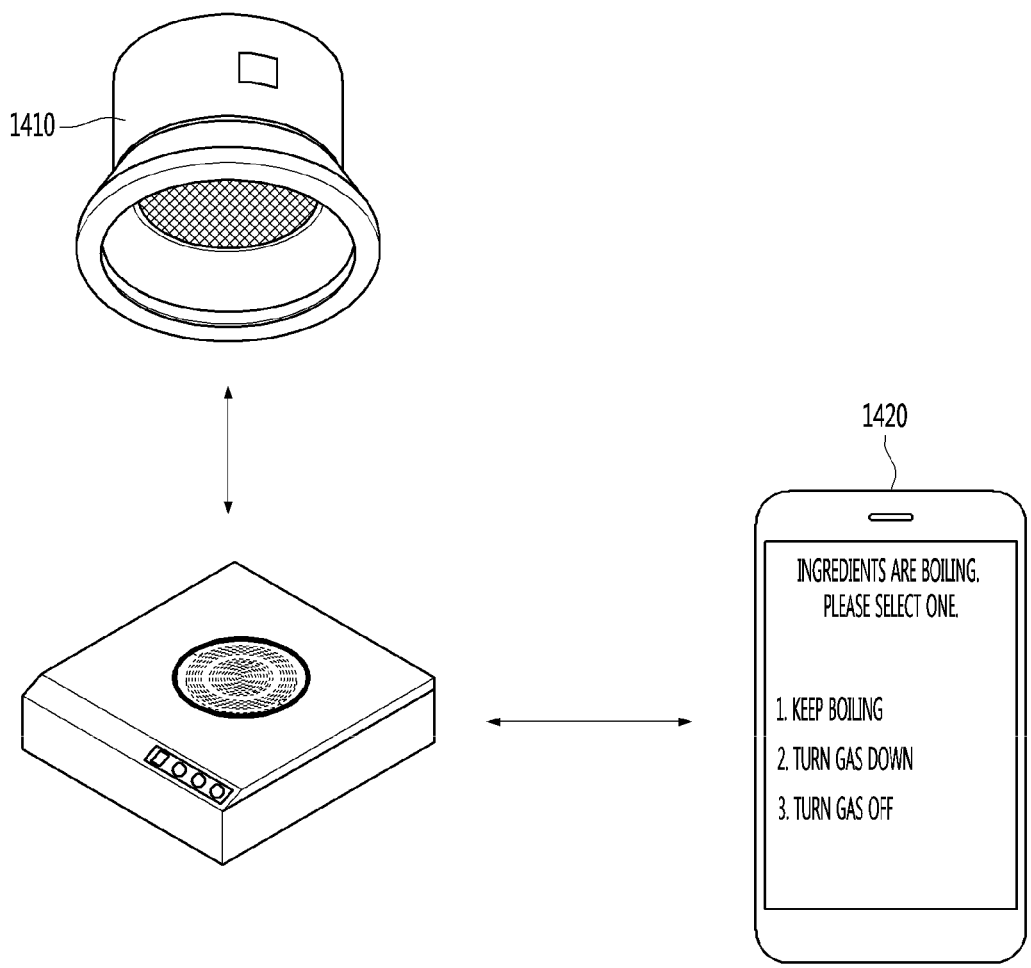
FIG. 13 is a view for illustrating an operation of an artificial intelligence cooking device when ingredients are boiling, according to an embodiment of the present invention.

This will be described with reference to FIG. 13. FIG. 13 is a view for illustrating an operation of an artificial intelligence cooking device when ingredients are boiling, according to an embodiment of the present invention.

When the ingredients in the cooking vessel boil are boiling, the processor can control the power conversion device such that the heating intensity of the heating portion is reduced or the heating operation of the heating portion is stopped. For example, when the power conversion device is the inverter 19, the processor 180 can control the inverter 19 to block the voltage applied to the heating portion (working coil) or to lower the voltage applied to the heating portion (working coil).

Further, the artificial intelligence cooking device may include the speaker. Further, when the ingredients in the cooking vessel are boiling, the processor 180 can output an alarm through the speaker. Further, the artificial intelligence cooking device can also operate in association with further devices. Specifically, the artificial intelligence cooking device can communicate with the further devices such as a mobile terminal 1420, a hood 1410, or the like.

Further, when the ingredients in the cooking vessel are boiling, the processor 180 can transmit a control command for operating the further devices. For example, when the ingredients in the cooking vessel are boiling, the processor 180 can transmit a control command for operating the hood 1410. Further, the processor 180 can transmit a notification to a further device and receive a control command from the further device.

For example, when the ingredients in the cooking vessel are boiling, the processor 180 can transmit a notification indicating that the ingredients in the cooking vessel are boiling to the mobile terminal 1420. Further, when a control command is received from the mobile terminal 1420 in response to the transmitted notification, the processor 180 can reduce the heating intensity of the heating portion or stop the operation of the heating portion based on the received control command.

As such, according to the present invention, since whether the ingredients are boiling is detected and the control is performed accordingly, the overflow of the ingredients, fire, or the like can be prevented and inconvenience of the user of constantly checking whether the ingredients are boiling can be prevented.

Next, a method for obtaining temperature information of the ingredients and obtaining information on whether the ingredients in the cooking vessel are boiling based on the temperature information of the ingredients will be described. The processor 180 can provide the data corresponding to the vibration signal to the artificial intelligence model to obtain the information on whether the ingredients in the cooking vessel are boiling.

Specifically, the processor 180 can provide the data corresponding to the vibration signal to the artificial intelligence model. In addition, the artificial intelligence model may be the neural network trained using the temperature information of the ingredients as the labeling data. In this case, the artificial intelligence model can output the result value, for example, the temperature information of the ingredients.

Further, the processor can obtain the information on whether the ingredients in the cooking vessel are boiling based on the temperature information output by the artificial intelligence model using the data provided to the artificial intelligence model. For example, when the artificial intelligence model outputs temperature information of 100° C., the processor 180 can determine that the ingredients in the cooking vessel are boiling.

In an example, when the artificial intelligence model outputs the temperature information, the heating portion can be controlled before the ingredients are boiling. Specifically, the processor 180 can control the power conversion device such that the heating intensity of the heating portion is reduced or the heating operation of the heating portion is stopped when the temperature of the ingredients is higher than a preset value based on the temperature information.

Further, the preset value may be lower than a boiling point. For example, the processor 180 can control the power supply conversion device such that the heating intensity of the heating portion is reduced or the heating operation of the heating portion is stopped when the temperature of the ingredients is higher than 95° C. As such, according to the present invention, the temperature of the ingredients is predicted, thereby preventing the ingredients from boiling in advance.

In an example, the processor can control, using the temperature information output from the artificial intelligence model and temperature information set by the user, the heating portion such that the ingredients maintain temperature information set by the user. Specifically, the processor can receive an input for setting the temperature information via the input unit.

Further, the processor can compare the temperature information set by the user with the temperature information output from the artificial intelligence model and perform the control based on the comparison result to perform the control such that the ingredients to maintain the temperature information set by the user. For example, when the user sets temperature information to be 70° C. and the artificial intelligence model outputs 75° C. of temperature information, the processor 180 can control the power conversion device to reduce the heating intensity.

In another example, when the user sets temperature information to be 70° C. and the artificial intelligence model outputs 65° C. of temperature information, the processor 180 can control the power conversion device to increase the heating intensity. In another example, when the user sets temperature information of 100° C. for 10 minutes and then of 70° C. for the next 10 minutes, the processor 180 can control the power conversion device based on the temperature information set by the user and the temperature information output from the artificial intelligence model.

Recently, in addition to a cooking scheme of simple boiling, a cooking scheme such as a sous vide scheme or the like in which maintenance of a constant temperature is important has emerged. Further, according to the present invention, cooking in accordance with various cooking schemes can be performed by only setting the temperature by the user.

Figure 14:
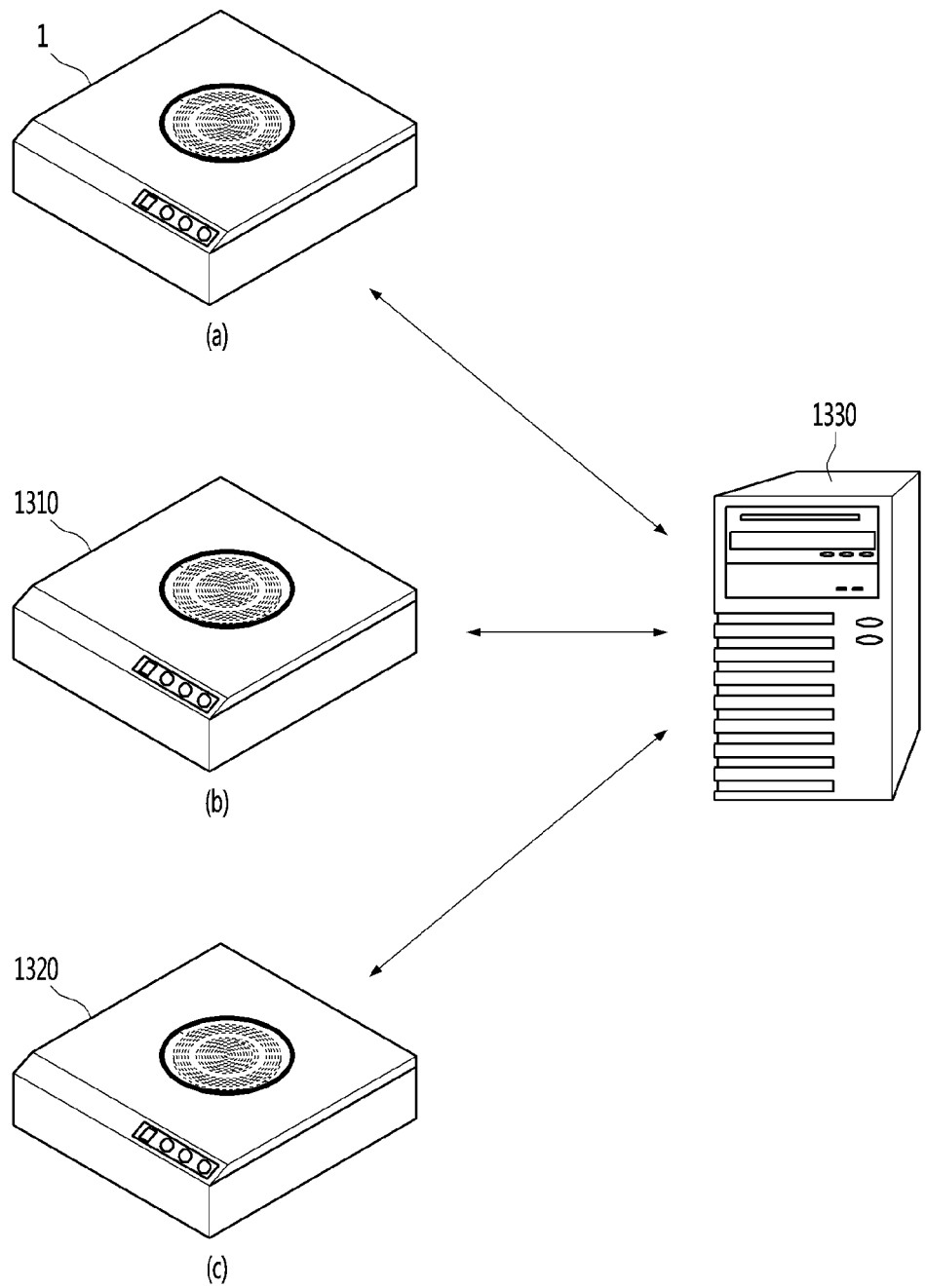
FIG. 14 is a diagram illustrating a method for operating an artificial intelligence cooking device according to another embodiment of the present invention.

FIG. 14 is a diagram illustrating a method for operating an artificial intelligence cooking device according to another embodiment of the present invention. In the foregoing embodiment, it is described that the artificial intelligence model is mounted in the artificial intelligence cooking device. However, the present invention is not limited thereto, and the artificial intelligence model can be mounted in an artificial intelligence server 1330.

In an example, the artificial intelligence server 1330 can communicate with a plurality of artificial intelligence cooking devices 1, 1310, and 1320 and provide a boiling detection service to the plurality of artificial intelligence cooking devices 1, 1310, and 1320. Specifically, the artificial intelligence cooking device 1000 can transmit the data corresponding to the vibration signal to the artificial intelligence server 1330.

In this case, the artificial intelligence server 1330 can receive the data corresponding to the vibration signal and input the data corresponding to the vibration signal into the artificial intelligence model to obtain the information on whether the ingredients in the cooking vessel are boiling. Further, the artificial intelligence server 1330 can transmit the information on whether the ingredients in the cooking vessel are boiling to the artificial intelligence cooking device 1000.

In an example, the artificial intelligence cooking device 1000 can receive the information on whether the ingredients in the cooking vessel are boiling, and can perform control based on the received information.

The present invention described above may be implemented as a computer-readable code in a medium where a program is recorded. A computer-readable medium includes all kinds of recording devices that store data that may be read by a computer system. Examples of the computer-readable medium may include hard disk drive (HDD), solid state drive (SSD), silicon disk drive (SDD), read-only memory (ROM), random access memory (RAM), CD-ROM, a magnetic tape, a floppy disk, an optical data storage device, and the like. Further, the computer may include a controller 180 of the terminal. Accordingly, the detailed description should not be construed as being limited in all respects but should be considered as illustrative. The scope of the present invention should be determined by reasonable interpretation of the appended claims, and all changes within the equivalent scope of the present invention are included in the scope of the present invention.

The invention claimed is:

1. An artificial intelligence cooking device comprising:
a plate including a heater configured to heat ingredients in a cooking vessel placed on the plate;
a main body forming a lower outer surface of the artificial intelligence cooking device;
a vibration sensor module including a vibration sensor disposed below the plate and configured to detect a vibration signal of the ingredients in the cooking vessel transmitted through the plate, and a housing accommodating the vibration sensor therein;
a pressing mechanism including a spring and a spring supporter connected to a lower plate of the main body to support the spring and configured to press the vibration sensor module in a direction of the plate; and
a processor configured to:
determine, via an artificial intelligence model having learned properties of the vibration signal, whether or not the ingredients in the cooking vessel are boiling based on the detected vibration signal provided to the artificial intelligence model and the learned properties of the vibration signal; and
output information indicating whether or not the ingredients are boiling based on the determination.

2. The artificial intelligence cooking device of claim 1, wherein the artificial intelligence model is a neural network trained by labeling information about whether ingredients are boiling on training data corresponding to a respective vibration signal.

3. The artificial intelligence cooking device of claim 1, wherein the vibration sensor directly contacts the plate.

4. The artificial intelligence cooking device of claim 1, wherein the artificial intelligence model is a neural network trained by labeling temperature information on training data corresponding to a respective vibration signal.

5. The artificial intelligence cooking device of claim 4, wherein the processor is configured to:
provide data corresponding to the vibration signal to the artificial intelligence model; and
determine whether or not the ingredients in the cooking vessel boil are boiling, based on temperature information output from the artificial intelligence model using the provided data.

6. The artificial intelligence cooking device of claim 1, wherein data corresponding to the vibration signal includes a feature vector representing at least one of a vibration intensity, a frequency, or a pattern of the vibration signal.

7. The artificial intelligence cooking device of claim 1, wherein the processor is configured to:
provide data of a first time period corresponding to the vibration signal to the artificial intelligence model to obtain first information about whether or not the ingredients in the cooking vessel are boiling;

provide data of a second time period that is a next time period after the first time period, to the artificial intelligence model to obtain second information on whether or not the ingredients of the cooking vessel are boiling; and determine that the ingredients in the cooking vessel are boiling when the first information and the second information indicate that the ingredient are boiling.

8. The artificial intelligence cooking device of claim 1, further comprising:

a power converter configured to supply a voltage to the heater, wherein the processor is configured to control the power converter such that a heating intensity of the heater is reduced or a heating operation of the heater is stopped when the processor determines the ingredients in the cooking vessel are boiling.

9. The artificial intelligence cooking device of claim 8, wherein the processor is further configured to:

provide data corresponding to the vibration signal to the artificial intelligence model; and control the power converter such that a heating intensity of the heater is reduced or a heating operation of the heater is stopped when a temperature of the ingredients is above a preset value based on temperature information output from the artificial intelligence model using the provided data.

10. The artificial intelligence cooking device of claim 1, further comprising:

wherein the vibration sensor module is accommodated in an internal space defined in the main body.

11. The artificial intelligence cooking device of claim 10, wherein the vibration sensor module further includes an outer holder receiving the vibration sensor therein, wherein the outer holder is disposed below the plate, and wherein the outer holder has an open upper face thereof such that an upper face of the vibration sensor faces with a lower face of the plate.

12. The artificial intelligence cooking device of claim 11, wherein the outer holder is in contact with the lower face of the plate.

13. The artificial intelligence cooking device of claim 11, wherein the outer holder surrounds side and lower portions of the vibration sensor.

14. The artificial intelligence cooking device of claim 11, wherein the vibration sensor module further includes:

an inner holder receiving the vibration sensor therein; and a connector connected to the outer holder and the inner holder to support the inner holder.

15. A method of controlling an artificial intelligence cooking device, the method comprising:

detecting, via a vibration sensor module disposed below a heating plate, a vibration signal of ingredients in the cooking device transmitted through the heating plate;

determining, via an artificial intelligence model having learned properties of the vibration signal, whether or not the ingredients in the cooking device are boiling based on the detected vibration signal provided to the artificial intelligence model and the learned properties of the vibration signal; and outputting information indicating whether or not the ingredients are boiling based on the determination, wherein the vibration sensor module comprises:

a vibration sensor below the heating plate, a housing accommodating the vibration sensor therein, a main body forming a lower outer surface of the artificial intelligence cooking device, and a pressing mechanism including a spring and a spring supporter connected to a lower plate of the main body to support the spring and configured to press the vibration sensor module in a direction of the heating plate.

16. The method of claim 15, wherein the artificial intelligence model is a neural network trained by labeling information about whether ingredients are boiling on training data corresponding to a respective vibration signal.

17. The method of claim 15, wherein the vibration sensor directly contacts the plate.

18. The method of claim 15, wherein the artificial intelligence model is a neural network trained by labeling temperature information on training data corresponding to a respective vibration signal.

19. A non-transitory computer readable medium storing instructions that when executed by a processor, perform the following:

receiving, via a vibration sensor module disposed below a heating plate, a vibration signal of ingredients in the cooking device transmitted through the heating plate;

determining, using an artificial intelligence model having learned properties of the vibration signal, whether or not the ingredients in the cooking device are boiling based on the detected vibration signal provided to the artificial intelligence model and the learned properties of the vibration signal; and outputting information indicating whether or not the ingredients are boiling based on the determination, wherein the vibration sensor module comprises:

a vibration sensor below the heating plate, a housing accommodating the vibration sensor therein, a main body forming a lower outer surface of the artificial intelligence cooking device, and a pressing mechanism including a spring and a spring supporter connected to a lower plate of the main body to support the spring and configured to press the vibration sensor module in a direction of the heating plate.

\* \* \* \* \*